(12) United States Patent (10) Patent No.: US 9,370,002 B2
Liu et al. (45) Date of Patent: Jun. 14, 2016

(54) SEGMENTED BEAMFORMING

(71) Applicant: Marvell World Trade Ltd., St. Michael (BB)

(72) Inventors: Yong Liu, Campbell, CA (US); Hongyuan Zhang, Fremont, CA (US); Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/320,306

(22) Filed: Jun. 30, 2014

(65) Prior Publication Data

US 2014/0314053 A1 Oct. 23, 2014

Related U.S. Application Data

(63) Continuation of application No. 12/762,029, filed on Apr. 16, 2010, now Pat. No. 8,767,683.

(60) Provisional application No. 61/170,492, filed on Apr. 17, 2009, provisional application No. 61/174,905, filed on May 1, 2009, provisional application No. 61/176,085, filed on May 6, 2009.

(51) Int. Cl.
*H04W 72/04* (2009.01)
*H04W 84/12* (2009.01)
(Continued)

(52) U.S. Cl.
CPC ......... *H04W 72/0446* (2013.01); *H04B 7/0617* (2013.01); *H04W 16/28* (2013.01); *H04W 84/12* (2013.01)

(58) Field of Classification Search
CPC .............................. H04L 45/74–45/745; H04W 72/0413–72/0446; H04B 3/54–3/56

USPC .................................. 370/336, 392; 375/257
See application file for complete search history.

(56) References Cited

U.S. PATENT DOCUMENTS 5,982,327 A * 11/1999 Vook et al. ..................... 342/380
7,602,760 B2 * 10/2009 Zeira ............................. 370/342
(Continued)

FOREIGN PATENT DOCUMENTS

CN        102177742        9/2011
EP        2 420 007 A1     2/2012
(Continued)

OTHER PUBLICATIONS

IEEE P802.11 n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
(Continued)

*Primary Examiner* — Edan Orgad
*Assistant Examiner* — Steven Willmore

(57) ABSTRACT

A method for beamforming in a communication network includes generating a plurality of beamforming training (BFT) units associated with a beamforming session between a pair of devices, where each of the plurality of BFT units corresponds to a different beamsteering vector, causing a first non-zero subset of the plurality of BFT units to be transmitted during a first timeslot, and causing a second non-zero subset of the plurality of BFT units to be transmitted during a second timeslot, where the first time timeslot and the second timeslot are not contiguous.

25 Claims, 31 Drawing Sheets

(51) Int. Cl.
*H04W 16/28* (2009.01)
*H04B 7/06* (2006.01)

(56) References Cited

U.S. PATENT DOCUMENTS

| | | | |
|---|---|---|---|
| 7,805,743 | B2 | 9/2010 | Onomatsu et al. |
| 8,509,130 | B2 | 8/2013 | Liu et al. |
| 8,706,039 | B2 | 4/2014 | Zhang et al. |
| 8,767,863 | B1 | 7/2014 | Palanivelu et al. |
| 2004/0142665 | A1* | 7/2004 | Papathanasion ..... H04B 7/0854 455/101 |
| 2005/0047517 | A1* | 3/2005 | Georgios ............. H04B 7/0417 375/267 |
| 2006/0182206 | A1* | 8/2006 | Coon et al. ..................... 375/346 |
| 2006/0221920 | A1 | 10/2006 | Gopalakrishnan et al. |
| 2006/0229021 | A1* | 10/2006 | Nakao ............................. 455/68 |
| 2006/0251183 | A1* | 11/2006 | Soffer ........................... 375/267 |
| 2008/0007454 | A1* | 1/2008 | Minkoff ............... H01Q 3/2611 342/379 |
| 2008/0095072 | A1 | 4/2008 | Shao et al. |
| 2009/0046010 | A1 | 2/2009 | Niu et al. |
| 2009/0232109 | A1* | 9/2009 | Nandagopalan ...... H04W 84/18 370/336 |
| 2009/0233549 | A1* | 9/2009 | Maltsev .................... H01Q 3/26 455/41.2 |
| 2009/0238156 | A1* | 9/2009 | Yong .................... H04B 7/0491 370/336 |
| 2009/0273520 | A1 | 11/2009 | Shao et al. |
| 2009/0318091 | A1* | 12/2009 | Wang et al. ................. 455/67.14 |
| 2010/0046660 | A1* | 2/2010 | Sikri et al. ..................... 375/285 |
| 2010/0054223 | A1 | 3/2010 | Zhang et al. |
| 2010/0056062 | A1 | 3/2010 | Zhang et al. |
| 2010/0103045 | A1 | 4/2010 | Liu et al. |
| 2010/0111089 | A1* | 5/2010 | Hsu et al. ....................... 370/392 |
| 2010/0214169 | A1* | 8/2010 | Kafle ....................... H01Q 3/26 342/368 |
| 2010/0215027 | A1 | 8/2010 | Liu et al. |
| 2010/0254466 | A1* | 10/2010 | Wang et al. .................... 375/259 |
| 2011/0150004 | A1* | 6/2011 | Denteneer ............. H04L 5/0023 370/476 |

FOREIGN PATENT DOCUMENTS

| | | |
|---|---|---|
| JP | 2006-025322 | 1/2006 |
| JP | 2009-044667 | 2/2009 |
| JP | 2009-077215 | 4/2009 |
| WO | WO-2007/040515 A2 | 4/2007 |
| WO | WO-2009/027931 A2 | 3/2009 |
| WO | WO-2009/059229 A1 | 5/2009 |
| WO | WO-2010/053738 A2 | 5/2010 |

OTHER PUBLICATIONS

IEEE Std. 802.11n[TM] "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).
IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.*, pp. 1-201 (2009).
Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Gilb, James, "IEEE 802.15.3TM Guide Addresses Untapped High-Rate Wireless Personal Area Network (WPAN) Market," *The Institute of Electrical and Electronics Engineers, Inc.* (available at <http://standards.ieee.org/announcements/pr_802153wpanguide.html>) pp. 1-3 (May 18, 2004).
First Office Action in corresponding Chinese Application No. 201080016968.3, dated Sep. 16, 2013, with English translation (24 pages).
Second Office Action in corresponding Chinese Application No. 201080016968.3, dated Mar. 24, 2014, with English translation (28 pages).
Third Office Action in corresponding Chinese Application No. 201080016968.3, dated Aug. 4, 2014, with English translation (27 pages).
Notice of Reasons for Rejection in corresponding Japanese Application No. 2012-505971, dated Jan. 7, 2014, with English translation (5 pages).
International Search Report in corresponding PCT Application No. PCT/US2010/031426, dated Aug. 5, 2010 (3 pages).
Written Opinion in corresponding PCT Application No. PCT/US2010/031426 dated, Aug. 5, 2010 (5 pages).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE Std 802.15.3[TM] "IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs)," *The Institute of Electrical and Electronics Engineers, Inc.*, 324 pages (Sep. 29, 2003).
Harada, "Project: IEEE P802.15 Working Group for Wireless Personal Area Network (WPANs)," IEEE 802.15-07-0693-003c, slides 24-33 (May 2007).
Hiertz et al., "The IEEE 802.11 Universe," *IEEE Communications Magazine*, pp. 62-70, (Jan. 2010).
Pyo et al., "Throughput Analysis and Improvement of Hybrid Multiple Access in IEEE 802.13.3c mm-wave WPAN," IEEE J. on Selected Areas in Communications, vol. 27, No. 8, pp. 1414-1424 (Oct. 1, 2009).
Wylie-Green et al., "Multi-band OFDM UWB solution for IEEE 802.15.3a WPANs," *2005 IEEE/Sarnoff Symposium on Advances in Wired and Wireless Communication*, 1 page (Apr. 2005).
Fourth Office Action in Chinese Application No. 201080016968.3, dated Mar. 31, 2015, with English translation (6 pages).
International Preliminary Report on Patentability in International Application No. US2010/031426, dated Oct. 18, 2011 (6 pages).
Office Action in Korean Application No. 10-2011-7024024, dated Dec. 10, 2015, with English translation (13 pages).

* cited by examiner

SEGMENTED BEAMFORMING

CROSS REFERENCE TO RELATED APPLICATIONS

The present application is a continuation of Ser. No. 12/762,029, now U.S. Pat. No. 8,767,683, entitled "Segmented Beamforming," filed on Apr. 16, 2010, which claims the benefit of U.S. Provisional Patent Applications Nos. 61/170,492 filed Apr. 17, 2009, 61/174,905, filed May 1, 2009, and 61/176,085, filed May 6, 2009, each of which is entitled "Segmented Beamforming Training for mmWave Systems." All of the applications referenced above are hereby incorporated by reference in their entireties.

FIELD OF TECHNOLOGY

The present disclosure relates generally to communication systems and, more particularly, to beamforming techniques used in such communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11n, and the IEEE draft standards 802.15.3, and 802.15.3c now in the process of being finalized, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a or the IEEE draft standard 802.11n. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, antennas and associated effective wireless channels are highly directional at frequencies near or above 60 GHz. As a result, the distance separating a pair of communicating devices has a significant impact on the data rate that the pair of communication devices can support. Further, when multiple antennas are available at one or both communicating devices, an efficient beam pattern allows the devices to better exploit spatial selectivity of the wireless channel and, accordingly, increase the data rate at which the devices communicate. Generally speaking, beamforming or beamsteering creates a spatial gain pattern having one or more high gain lobes or beams (as compared to the gain obtained by an omni-directional antenna) in one or more particular directions, with reduced gain in other directions. If the gain pattern for multiple transmit antennas, for example, is configured to produce a high gain lobe in the direction of a receiver, better transmission reliability can be obtained over that obtained with an omni-directional transmission.

U.S. patent application Ser. No. 12/548,393, filed on Aug. 26, 2009 and entitled "Beamforming by Sector Sweeping," and U.S. Provisional Patent Application No. 61/091,914 entitled "Beamforming by Sector Sweeping," filed Aug. 26, 2008, are both expressly incorporated by reference herein in their entireties. These applications are generally related to a beamforming technique referred to as "beamforming by sector sweeping." In one implementation of beamforming by sector sweeping for determining a transmit beamforming pattern to be applied by a first device when transmitting data to a second device, the first device transmits a plurality of training packets to the second device, where the first device applies a different beamforming pattern when transmitting each training packet. The second device generally determines which of the training packets had the highest quality (e.g., had the highest signal-to-noise ratio (SNR), the lowest bit error rate (BER), etc.) and notifies the first device. The first device can then utilize the transmit beamforming pattern that yielded the highest quality packet. Similarly, to determine a receive beamforming pattern to be applied by the first device when receiving data from the second device, the second device transmits a plurality of training packets to the first device, and the first device applies a different beamforming pattern when receiving each training packet. The first device generally determines which of the training packets had the highest quality, and can then utilize the receive beamforming pattern that yielded the highest quality packet.

Thus, generally speaking, beamforming requires an exchange of beamforming training data between communication devices. This data, along with other management information, takes up a large portion of the available bandwidth, resulting in a lower data throughput. This consequence is particularly significant in applications with poor buffering capability.

SUMMARY

A method for beamforming in a communication network includes generating a plurality of beamforming training (BFT) units associated with a beamforming session between a pair of devices, where each of the plurality of BFT units corresponds to a different beamsteering vector, causing a first non-zero subset of the plurality of BFT units to be transmitted during a first timeslot, and causing a second non-zero subset of the plurality of BFT units to be transmitted during a second timeslot, where the first time timeslot and the second timeslot are not contiguous.

In various implementations, one or more of the following features may be included. The beamforming session is one of a sector sweeping session or a beam refinement session. The method includes applying a different beamsteering vector to a plurality of antennas as each of the BFT units is transmitted via the plurality of antennas so that each of the plurality of BFT units corresponds to a different beamsteering vector. The method includes transmitting each of the plurality of BFT units using a same beamsteering vector, so that each of the plurality of BFT units is to be received at a peer device using a different beamsteering vector so that each of the plurality of BFT units corresponds to a different beamsteering vector. The first timeslot is associated with a first beacon interval, and the second timeslot is associated with a second beacon interval distinct from the first beacon interval. The first timeslot is a first beacon time (BT) timeslot, and the second timeslot is a second BT timeslot. The first timeslot is a first association beamforming training (A-BFT) timeslot, and the second timeslot is a second A-BFT timeslot. The first timeslot is a BT timeslot, and the second timeslot is a service period (SP) timeslot. The first timeslot is one of an A-BFT timeslot, an SP timeslot, or a contention-based period (CBP) timeslot, and the second timeslot is one of an SP timeslot or a CBP timeslot. Each of the plurality of BFT units includes an indicator to indicate that the beamforming session is segmented between at least two non-contiguous timeslots. Each of the plurality of BFT units includes an index that uniquely identifies the BFT unit in the plurality of BFT units. The index is a global index; each BFT unit in the first subset further includes a local index that uniquely identifies the BFT unit in the first subset, and each BFT unit in the second subset further includes a local index that uniquely identifies the BFT unit in the second subset. Each BFT unit in the first subset of the plurality of BFT units further includes a first duration indication that indicates a duration of the first timeslot, and each BFT unit in the second subset of the plurality of BFT units further includes a second duration indication that indicates a duration of the second timeslot. Each BFT unit in the first subset of the plurality of BFT units further includes a first remaining time indication that indicates a time interval remaining until the end of the first timeslot, and each BFT unit in the second subset of the plurality of BFT units further includes a second remaining time indication that indicates a time interval remaining until the end of the second timeslot. The first subset is associated with a first segment and the second subset is associated with a second segment, and ach BFT unit in the first subset and the second subset further includes a segment counter that uniquely identifies a segment with which the BFT unit is associated. The first subset is associated with a first segment and the second subset is associated with a second segment, each of the plurality of BFT units includes an indicator that specifies a total number of segments associated with the beamforming session. The method includes receiving a feedback frame after the first subset is transmitted but before the second subset is transmitted, where causing the second subset to be transmitted includes causing the second subset to be transmitted in response to an information element included in the feedback frame. The method includes receiving a frame after the first subset is transmitted but before the second subset is transmitted, where the frame includes scheduling information related to at least one superframe, and selecting the second timeslot based on the scheduling information. The method includes receiving a beacon frame before the first subset is transmitted and before the second subset is transmitted, wherein the beacon frame includes a beamforming duration limitation, and dividing the plurality of BFT units into a plurality of non-zero subsets including the first subset and the second subset in accordance with the beamforming duration limitation. The beamforming duration limitation specifies a duration of a time period allocated for the beamforming session, where the time period is associated with one of a CBP timeslot or an SP timeslot.

In another embodiment, a method for beamforming in a communication network includes receiving a first non-zero subset of beamforming training (BFT) units during a first segment of a beamforming session, where the beamforming session is one of a sector sweeping session and a beam refinement session; determining whether a beamsteering vector can be selected based on the received first subset of BFT unit; and providing an indication of whether a second non-zero subset of BFT units is to be transmitted during a second segment of the beamforming session in response to determining that a beamsteering vector cannot be selected based on the received first subset of BFT units, where each BFT unit in a set including the first subset and the second subset is associated with a different direction.

In another embodiment, an apparatus includes a segmented beamforming controller configured to segment a plurality of beamforming training (BFT) units associated with a beamforming session into at least a first non-zero subset and a second non-zero subset, and cause the first subset to be transmitted during a first timeslot and the second subset to be transmitted during a second timeslot, where the first time timeslot and the second timeslot are not contiguous; and a beamforming controller to apply a different steering vector to an antenna array as each of the plurality of BFT units is transmitted.

DETAILED DESCRIPTION

Figure 1:
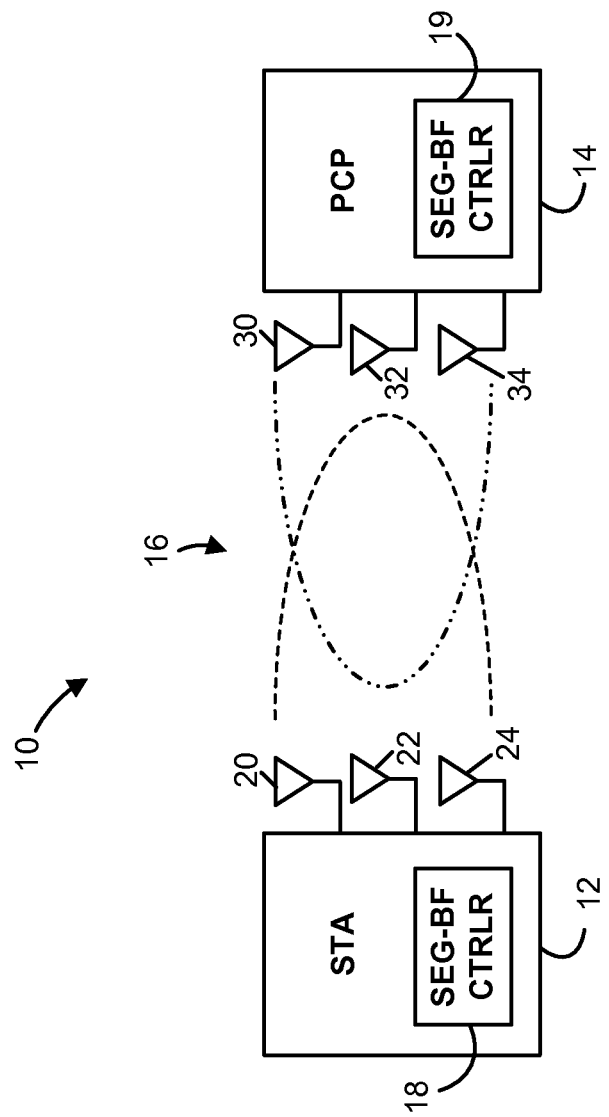
FIG. 1 is a block diagram of a communication system including a pair of devices that use segmented beamforming training (BFT) techniques in accordance with an embodiment of the present disclosure.

FIG. 1 illustrates a wireless communication system 10 in which a pair of communicating devices, such as a station 12 and a piconet central point (PCP) 14, implement segmented beamforming training to efficiently and accurately determine a suitable beamforming configuration while maintaining a high throughput of data on a shared wireless communication channel 16, according to an embodiment of the present disclosure. In an embodiment, a segmented beamforming training session is conducted using a set of different beamforming training (BFT) units (packets, frames, etc.) that is divided into two or more subsets and transmitted during two or more timeslots, at least some of which are non-contiguous, to define respective segments of the training session. The devices 12 and 14 communicate data in timeslots scheduled between non-contiguous timeslots used for beamforming training to maintain a high data throughput while effectively distributing a beamforming training session in time. Further, in some situations, other devices that share a communication channel with the devices 12 and 14 in the wireless communication system 10 communicate between the non-contiguous timeslots used for segmented beamforming training.

Unlike a continuous beamforming session (illustrated in FIGS. 3A-B and described below) that requires an uninterrupted block of time sufficiently large to transmit or attempt to receive a set of BFT units, a segmented beamforming training session provides the devices 12 and 14 with flexibility both at an initial stage of beamforming training and at subsequent, advanced stages of beamforming training. According to one scenario, for example, the PCP 14 determines how much of the time available in a superframe the devices 12 and 14 can "afford" to dedicate to management data, such as beamforming training data, in view of an application requirement. Based on this determination, the PCP 14 then determines how many superframes are required to accommodate a beamforming training session, and divides the session into a number of segments in accordance with the determined number of superframes. In some embodiments, the PCP 14 divides the beamforming training session evenly between the segments, while in other embodiments the segments are not of the same size.

In another example scenario, the station 12 determines that two or more segments, or possibly the entire segmented beamforming training session, can fit into a single superframe but not into a single timeslot. In accordance with an embodiment of the system 10, the station 12 in this case conducts a segment of the beamforming training session in one timeslot, and requests allocation of an additional timeslot to continue the beamforming training session from the PCP 14. Moreover, in some scenarios, the station 12 or the PCP 14 chooses to complete only some of the segments into which a beamforming training session is divided, and accordingly uses the result of a partially completed beamforming training session to select a suitable beamsteering vector.

As applied herein to beamforming training, the term "session" refers to one instance of transmitting a set of BFT units between a pair of devices using a different transmit steering vector and/or a different receive steering vector for each BFT unit, so that one or more suitable transmit and/or receive steering vectors can be selected as a result of the transmitting the set (it is also possible that none of the BFT units in the set reaches the target device, in which case a beamforming training session fails to yield a suitable steering vector). For simplicity, beamforming training is referred to hereinafter as just "beamforming," a beamforming training session is referred to as a "beamforming session," and a segment of beamforming training session is referred to as a "beamforming segment." Also, a set or sequence of different BFT units associated with a beamforming session is referred to herein as a "beamforming session set."

In an embodiment, a beamforming session set corresponds to a set of different outbound or inbound directions of transmission or reception of an antenna array. Each outbound or inbound direction in an embodiment corresponds to a different selection of a vector (codeword) from a matrix (codebook) describing the entire 360-degree space or a certain portion thereof. Also, an entire or partial beamforming session set in some situations is transmitted or received using an omni pattern mode or quasi-omni pattern mode (i.e., closely approximating the omni mode), as described in more detail below.

The devices 12 and 14 in various embodiments apply segmented beamforming techniques to one or more of a transmit sector sweeping (TxSW) procedure, a receive sector sweeping (RxSW) procedure, a transmit beam refinement procedure, and a receive beam refinement procedure. Further, in different embodiments, segmented beamforming is conducted during different periods within a superframe, such as during a beacon time (BT) timeslot or an association beamforming training (A-BFT) timeslot, for example. A segmented beamforming session is distributed among several timeslots of a superframe in some embodiments, and among timeslots in different superframes in other embodiments. In some situations, a device chooses to complete only some of the segments of a beamforming session. For clarity, example superframe and timeslot scheduling techniques are described below with reference to FIG. 2. Also, an information element used to control various stages of beamforming, in accordance with an embodiment, is discussed with reference to FIG. 4.

Each BFT unit, in an embodiment, includes an identifier that uniquely identifies the BFT unit in the beamforming session set. In some embodiments, a BFT unit additionally includes an identifier that uniquely identifies the BFT unit in the beamforming segment, a duration indicator that indicates the duration of the timeslot used for the beamforming segment, or other indication of how a beamforming session set is segmented. In an embodiment, one or both of the devices 12 and 14 provide information related to segmentation of a beamforming session set in frames (or other data units) other than BFT units. Various techniques for formatting BFT units, segmenting beamforming session, etc. sets are described with reference to FIGS. 5-24.

With continued reference to FIG. 1, the device 12 in the example system 10 is high-definition digital television set, and the device 14 is a high-definition (HD) digital video disc (DVD) player that supplies a high-rate stream of packets to the device 12 via the channel 16. The devices 12 and 14 are equipped with respective sets of one or more antennas 20-24 and 30-34 that provide a wireless replacement for a High-Definition Multimedia Interface (HDMI) cable. The device 14 in this example configuration operates as a PCP with respect to the device 12 (although the device 14, at other times and/or with respect to other devices not shown in FIG. 1 can operate as a station, as opposed to a PCP). The devices 12 and 14 include segmented beamforming controllers 18 and 19, respectively, to implement segmented beamforming techniques of the present disclosure.

Although the example wireless communication system 10 illustrated in FIG. 1 includes two devices 12, 14, each with three antennas, the wireless communication system 10 in general can include any number of devices, each equipped with the same or a different number of antennas (e.g., 1, 2, 3, 4 antennas and so on). For beamforming, however, at least one of the devices 12, 14 generally should include more than one antenna. When the communication system 10 includes more than two devices, one of these devices in an embodiment operates as a PCP, and the other devices operate as stations.

In general, devices in the wireless communication system 10 operate in multiple modes (e.g., a transmit mode and a receive mode). Accordingly, in some embodiments, antennas 20-24 and 30-34 support both transmission and reception. Alternatively or additionally, a given device includes separate transmit antennas and separate receive antennas. It will be also understood that because each of the devices 12 and 14 has a single antenna or multiple antennas, depending on the particular implementation, the wireless communication system 10 can be a multiple input, multiple output (MIMO) system, a multiple input, single output (MISO) system, a single input, multiple output (SIMO) system, or a single input, single output (SISO) system.

Prior to a more detailed description of segmented beamforming techniques, examples of continuous beamforming are briefly discussed with reference to FIGS. 2, 3A, and 3B.

Figure 2:
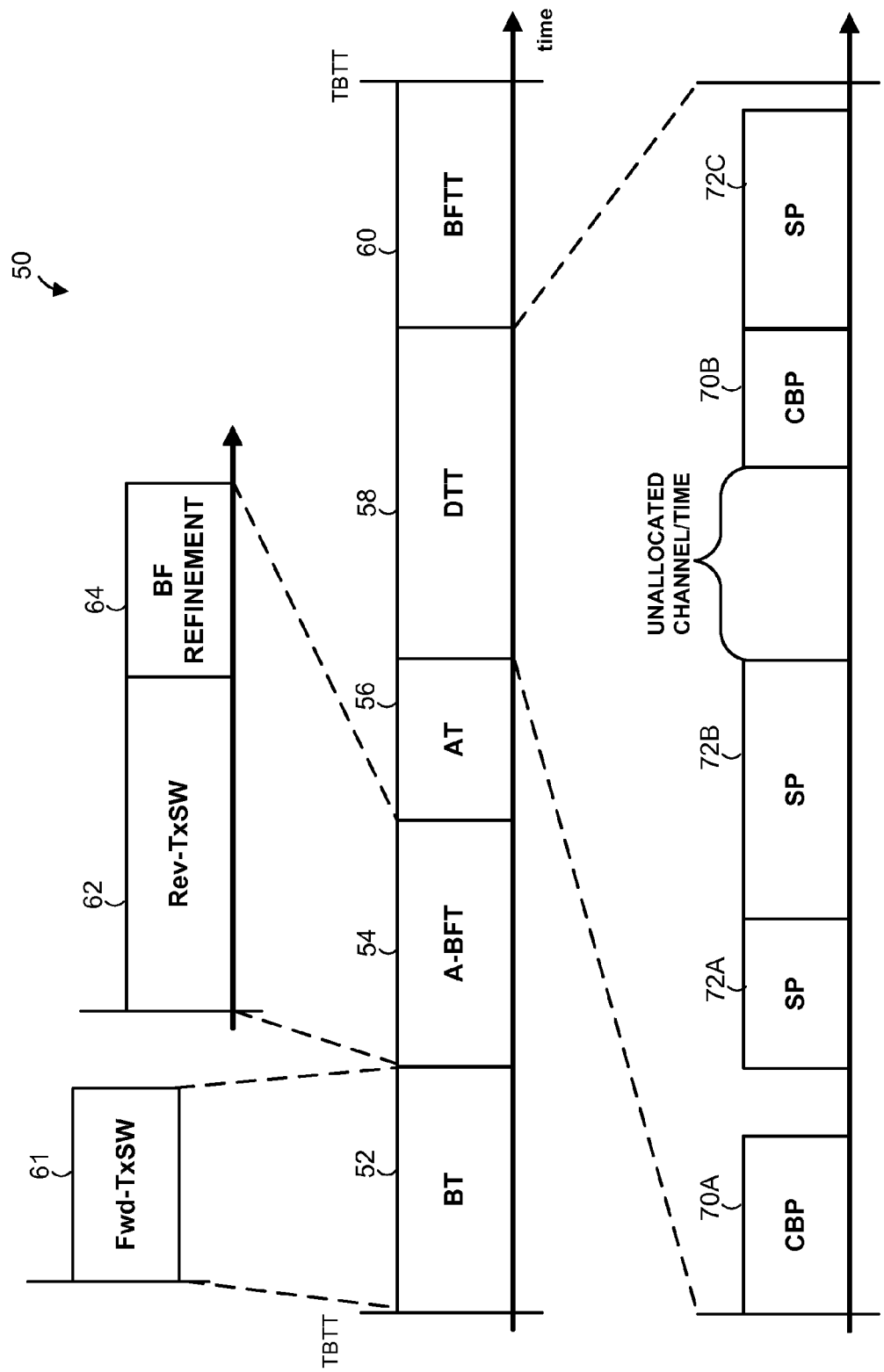
FIG. 2 is a block diagram of a superframe including a timeslot for beamforming by sector sweeping and refinement, in accordance with an example communication protocol.

Referring first to FIG. 2, a schedule according to which the network devices 12 and 14 communicate, in accordance with one embodiment, includes a superframe 50 having several periods, referred to herein as "timeslots," serving different purposes. In general, a timeslot presents a transmission opportunity, a reception opportunity, or both to one or several devices, as explained below. Timing of the superframe 50 in an embodiment is established by a PCP, for example, and is measured relative to a target beacon transmission time (TBTT). The time period between two adjacent TBTTs also can be referred to as beacon interval (BI). The superframe 50 includes a BT timeslot 52, an A-BFT timeslot 54, an announcement time (AT) timeslot 56, a data transmit time (DTT) timeslot 58, and a beamforming training time (BFTT) timeslot 60. It is noted that the timeslots within the superframe 50 are not drawn to scale, and that the duration of each of the timeslots 52-60 can be configurable and/or implementation-dependent. Further, although the superframe 50 is illustrated in FIG. 2 with specific types of timeslots in a specific order, in various embodiments one or more additional types of timeslots are included, one or more illustrated timeslots are omitted, and the order of timeslots is different during a given beacon interval.

In one implementation, the BT timeslot 52 is used by the PCP transmit discovery beacons. In addition to alerting stations proximate to the PCP the presence of the PCP, data transmitted during the BT timeslot 52 is used for beamforming in some embodiments. In other words, beacons transmitted during the BT timeslot 52 are BFT units of a beamforming session set. If a station is new to the network 10 and is not yet beamformed, the station in some embodiments applies an omni-mode beamforming vector for omni-directional coverage to its receive antenna set as each beacon is transmitted by the PCP during the BT timeslot 52 using a different transmit beamforming vector. The new station then measures the quality of each received beacon (e.g., a signal to noise ratio (SNR), a bit error rate (BER), etc.), and PCP uses the measurements in determining a beamforming vector that provides the best quality, for example, for beamforming in the outbound direction, or "transmit beamforming." Because the information transmitted during the BT timeslot 52 is primarily for use by unbeamformed devices, the PCP transmits data during this interval typically at a low data rate.

In the example format of FIG. 2, the A-BFT timeslot 54 is allocated primarily so that new stations that are not yet beamformed can perform beamforming training with the PCP 14. During the A-BFT timeslot 54, the unassociated station, in some scenarios, performs transmit beamforming training or receive beamforming training with the PCP 14. Similar to the BT timeslot 52, the A-BFT timeslot 54 typically does not include information or communication opportunities that associated and beamformed stations are intended to use.

In an embodiment, the BT timeslot 52 includes a "forward" transmit sector sweeping portion 61 to transmit BFT units from a PCP to an unbeamformed station, and the A-BFT timeslot 54 includes a "reverse" transmit sector sweeping portion 62 to transmit BFT units from an unbeamformed station to the PCP, and a beam refinement portion 64. If, for example, a PCP transmits 36 or 64 BFT units during a continuous forward sector sweeping session in the BT timeslot 52, the TxSW portion 61 must be large enough to accommodate these 36 or 64 BFT units. Also, if the station transmits 36 or 64 BFT units during a continuous reverse sector sweeping session in the A-BFT timeslot 54, the TxSW portion 62 must be large enough to accommodate these 36 or 64 BFT unit. In some embodiments, the TxSW portion 62 also includes a time period during which the new station provides feedback to the PCP. Once the entire sector sweeping session is completed, the PCP and the new station proceed to beam refinement in at least some embodiments. Similar to the transmit sector sweeping portion 62, the beam refinement portion 64 in the embodiment of FIG. 2 must be large enough to accommodate an entire beam refinement session. Thus, if continuous sector sweeping and beam refinement techniques are used, the PCP reserves large periods of time to accommodate potentially long training periods.

In an embodiment, the AT timeslot 56 is used by a PCP to announce timeslot allocation and scheduling information, for example, to stations already associated with the network. For example, the PCP, in one embodiment, indicates the types and corresponding start times of timeslots in the DTT interval 58. In some scenarios discussed below, a PCP designates one or several timeslots within the DTT interval 58, or service periods within such timeslots, to be used with short-preamble PHY data units. In general, the PCP exchanges management frames with one or several stations in the AT timeslot 56 related to scheduling of service periods, contention-based periods, BFT periods, etc., channel measurement, association information, and other data.

Further, the DTT timeslot 58 is used to transmit data between the PCP and a communicating station, or between two or more communication stations. In some embodiments, the DTT timeslot 58 is divided into multiple timeslots, and the PCP announces the scheduling and assignment of these timeslots during the AT timeslot 56. For example, the DTT timeslot 58 includes contention-based periods (CBP) several service periods (SPs) 72A-C. In general, a service period is allocated by the PCP for a particular function, such as for two stations to communicate with each other. The contention periods 70A-B define time resources that communicating devices can dynamically acquire in real time (as opposed to asking the PCP to allocate time to the device and waiting to be informed by the PCP of an allocated time period, for example).

The BFTT timeslot 60 is used to perform beamforming training between the PCP and one or several associated stations, or between several associated stations that discover each other via a series of request and response frames.

Figure 3A:
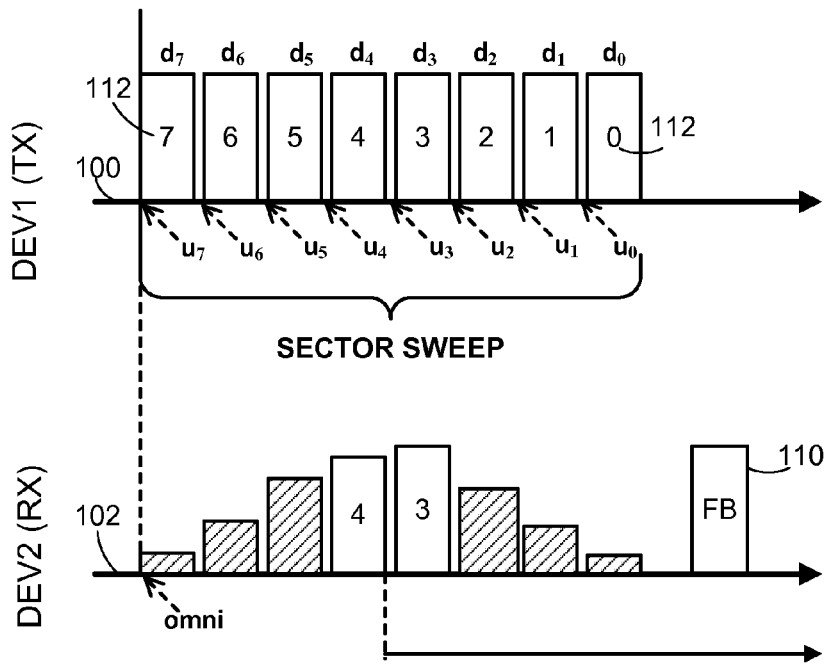
FIG. 3A is a block diagram that illustrates a continuous sector sweeping technique.

FIG. 3A is a timing diagram that illustrates data transmitted during an example continuous TxSW session between a multi-antenna device 100 (Tx) and another device 102 (Rx) during a BFT period (e.g., the duration of the TxSW period 62). In an embodiment, one of the devices 100 and 102 operates as a PCP, and the other one of the devices 100 and 102 operates as a station. To identify an efficient transmit steering vector $u_{TX}$, the multi-antenna station 100 in this example iteratively applies a series of transmit steering vectors $u_1, u_2, \ldots u_n$ to the antenna array of the station 100 and transmits N respective BFT units $d_1, d_2, \ldots d_n$, defining a beamforming session set S, via the antenna array for the transmit steering vectors $u_1, u_2, \ldots u_n$. Thus, each of the BFT units $d_1, d_2, \ldots d_n$ corresponds to one of the transmit steering vectors $u_1, u_2, \ldots u_n$ (e.g., $d_1$ corresponds to $u_1$, $d_2$ corresponds to $u_2$, etc.) Preferably, the peer station 102 receives or, at least, attempts to receive the BFT units $d_1, d_2, \ldots d_n$ using the same receive steering vector (or an omni or quasi-omni transmit pattern mode, a single antenna, etc.) so as to assess the quality of received BFT units $d_1, d_2, \ldots d_n$, in view of the parameters of only the transmitting antenna array of the transmitting station 100.

In the example in FIG. 3A, the TxSW session covers eight distinct sectors 0-7. In an embodiment, the eight sectors evenly cover the 360-degree space, i.e., collectively provide omni-directional coverage. Each of the BFT units $d_1, d_2, \ldots d_n$, is transmitted in a direction associated with a different one of the eight sectors 1, 2, . . . n. Further, in this embodiment, each of the BFT $d_1, d_2, \ldots d_n$, includes a sector identifier 112 that specifies the corresponding sector in an information element at the Media Access Channel (MAC) layer, for example. The sector identifier 112 thus operates as a BFT unit index unique for a particular beamforming session. For clarity, these sector identifiers are illustrated in FIG. 3A as numbers inside the blocks depicting the corresponding BFT units $d_1, d_2, \ldots d_n$.

Following the communication of N BFT units, the station 102, in an embodiment, assesses the quality of each received BFT unit $d_1, d_2, \ldots d_n$, using any desired technique and transmit a feedback frame 110 to the station 100. The relative quality of the received BFT units $d_1, d_2, \ldots d_n$, is schematically illustrated in FIG. 3A using different bar heights, with shading indicating a level of quality below a minimum quality threshold. Thus, in this example scenario, the station 102 successfully received BFT units 4 and 3 but failed to receive BFT units 7-5 and 2-0. Because the quality of the received BFT unit 3 is higher than the quality of the received BFT unit 4, the station 102 includes the identity of the BFT unit 3 in the feedback frame 110.

In an embodiment, sector identifiers serve as a countdown to the end of the TxSW session. Thus, upon successfully receiving the BFT unit 4, the station 102 determines that four more BFT units are to follow. It is noted that even if the station 102 fails to receive one or more of the four remaining BFT units, the station 102 accurately determines the end of the time period allocated for the TxSW session (for a more detailed discussion of this technique, see the U.S. patent application Ser. No. 12/548,393 incorporated by reference above).

Figure 3B:
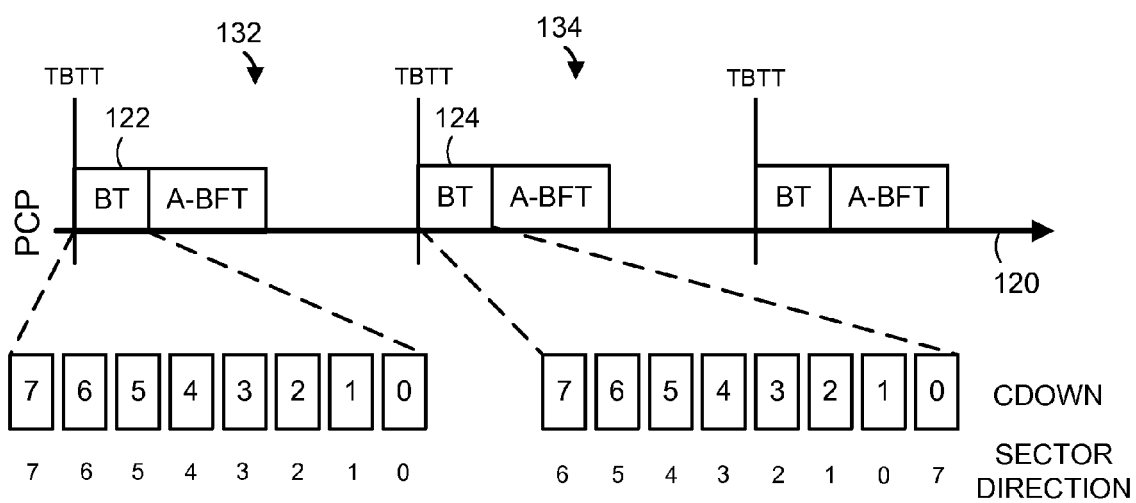
FIG. 3B is a block diagram that illustrates another continuous sector sweeping technique.

Now referring to FIG. 3B, in an embodiment, a PCP 120 transmits discovery beacons as BFT units during several BT timeslots 122 and 124 of the respective beacon intervals 132 and 134, and each of the BT timeslots 122 and 124 includes a complete instance of a continuous TxSW session. In other words, the PCP 120 sweeps the same eight sectors during each of the BT timeslots 122 and 124. To reduce beacon collisions, however, the PCP 120 varies the order in which the sectors are swept for each beamforming session. Accordingly, in this embodiment, the index of a BFT unit does not always correspond to the direction in which the BFT unit is being transmitted, and operates primarily as a countdown to the end of the beamforming session.

Figure 4:
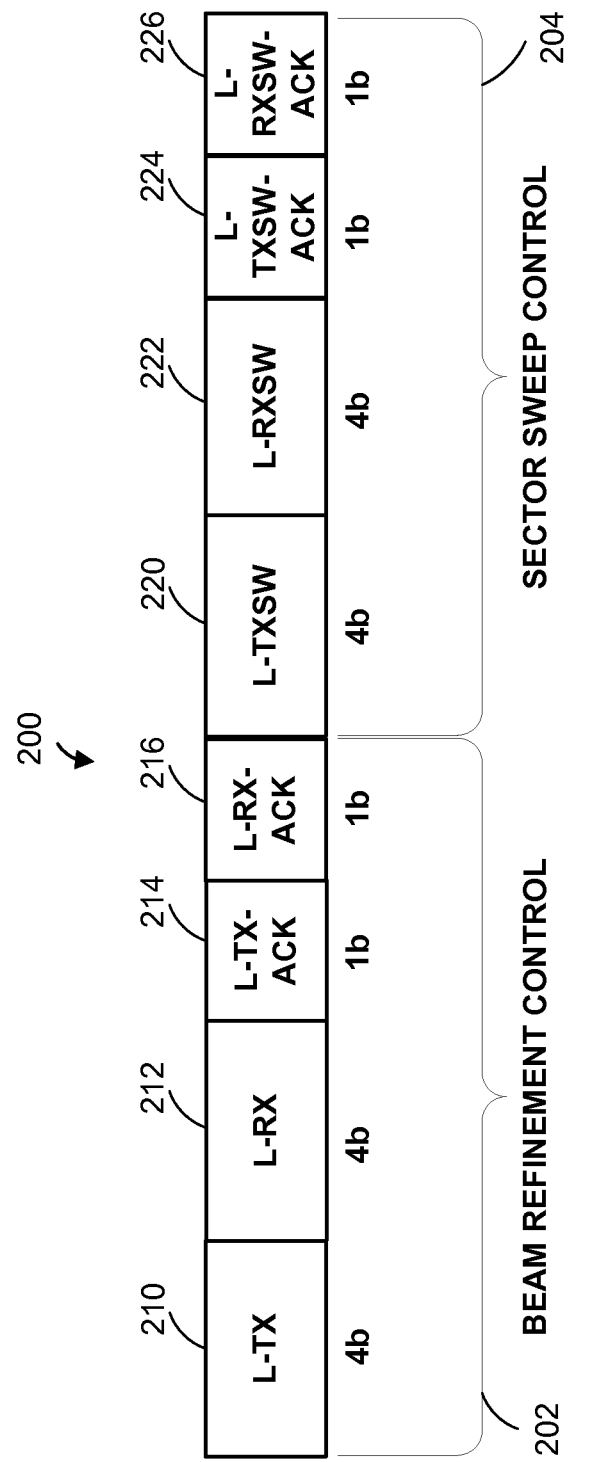
FIG. 4 is a block diagram of an example information element that can be used in a communication frame to control beamforming training.

In general, a continuous beam refinement session in some embodiments is similar to the continuous TxSW session described with reference to FIG. 3A or FIG. 3B. In addition to transmit sector sweeping in one direction (e.g., the station 12 to the PCP 14), a pair of devices, conducts transmit sector sweeping in the opposite direction (e.g., the PCP 14 to the station 12) as well as receive sector sweeping in both directions, and possibly beam refinement in both directions for both receiving and transmitting, in accordance with an embodiment. To efficiently control the selection of beamforming phases such as sector and refinement, as well as beamforming directions such as the receive direction and the transmit direction, PCPs and stations in some embodiments exchange beamforming control information in various communication frames. FIG. 4 illustrates an example beamforming training (BFT) control information element (IE) 200 that is used in communication frames to improve the flexibility of beamforming, and to reduce the overhead associated with communicating beamforming control information, in some embodiments of the present disclosure. Depending on the embodiment, the BFT control IE 200 is used in some or all of discovery beacon frames, other beacon frames, BFT units, BFT request and BFT response frames, etc.

The example IE 200 includes one or both of a beam refinement control element 202 and a sector sweep control element 204. The beam refinement control element 202 includes an L-TX field 210, an L-RX field 212, an L-TX-ACK field 214, and an L-=RX-ACK field 216. Similarly, the sector sweep control element 204 includes an L-TXSW field 220, an L-RXSW field 222, an L-TXSW-ACK field 224, and an L-RXSW-ACK field 226. The beam refinement control element 202 and the sector sweep control element 204 specify the beamforming procedures desired by the device (e.g., a PCP or a station) that transmits the BFT control IE 200, as well as approval or rejection of similar requests for beamforming procedures requested by a peer device.

The L-TX field 210 specifies a number of training sequences a station wishes to transmit during a transmit beam refinement training session; and the L-RX field 212 specifies a number of training sequences the station wishes to receive during a receive beam refinement training session. In some embodiments, training sequences used during a beam refined training session are shorter than beamforming training packets used during a sector sweeping session and, in some of these embodiments, are combinable. For simplicity, the term "BFT units" is used herein to refer to training sequences as well as to BFT packets used in sector sweeping. In some embodiments, each of the fields 210 and 212 is four-bit field. In other embodiments, the fields 210, 212 can be different numbers of bits, i.e., more or less than four bits. A certain value, such as zero, can indicate that the station does not wish or is not capable of conducting the corresponding beam refinement training session.

The fields 214 and 216 can be single-bit fields to indicate either confirmation or rejection of a corresponding beamforming request from a peer station. Referring back to FIG. 1, for example, the station 12 in an example scenario transmits a frame to the PCP 14 including the IE 200 with the L-TX field 210 set to N>0. In response, the PCP 14 transmits a frame to the station 32 that similarly includes the IE 200, and in which the L-TX-ACK field 214 is set to 0. The station 12 accordingly skips the transmit beam refinement procedure. If, on the other hand, the station 12 receives a frame in which the L-TX-ACK field 214 is set to 1, the station 12 proceeds to transmit N data units to the PCP 14 during a transmit beam refinement procedure. Similarly, the L-RX-ACK field 216 set to 0 can indicate a rejection of a request of a peer station for a certain number of training data units, and the L-RX-ACK field 216 set to 1 indicates that the device has granted such a request. It is also possible to use the fields 214 and 216 to reject potential transmit and receive beam refinement requests that a peer station may transmit in the future (i.e., reject beam refinement requests before the fact).

Devices can utilize the fields 220-226 in a similar manner. In this manner, devices can efficiently and independently negotiate each of the eight possible BFT sessions: receive beam refinement in the direction from a first device to a second device, transmit beam refinement in the direction from the first device to the second device, receive beam refinement in the direction from the second device to the first device, transmit beam refinement in the direction from the second device to the first device, receive sector sweeping in the direction from the first device to the second device, transmit sector sweeping in the direction from the first device to the second device, receive sector sweeping in the direction from the second device to the first device, and transmit sector sweeping in the direction from the second device to the first device.

If desired, the fields 214 and 216 can occupy more bits and can indicate the number of training data units a device will transmit or receive during a BFT procedure of the peer device. In these embodiments, a device can use the fields 214 and 216 for detailed confirmation (e.g., a station that transmits a frame with L-TX=N to a peer station and checks whether L-TX-ACK=N in a frame transmitted from the peer device). In some scenarios, devices use fields 214 and 216 to "counter-offer" a request (e.g., a station that transmits a frame with L-TX=$N_1$ to a peer station and receives a frame with L-TX-ACK=$N_2$ in a frame transmitted in response from the peer station).

With continued reference to FIG. 4, devices can use the fields 220-226 in a similar manner. More specifically, a device can request transmit sector sweep beamforming and receive sector sweep beamforming using the fields 220 and 222, respectively, and accept or reject sector sweep beamforming requests from the other device using the fields 224 and 226.

In general, a beamforming control IE can include one or both of the beam refinement control element 202 and the sector sweep control element 204. For example, a protocol can mandate that sector sweep beamforming be mandatory with a certain defined number of training data units, and that beam refinement be optional with a variable number of training data units. Depending on the desired implementation, the beamforming control IE also includes an information element identifier (not shown in FIG. 4).

Further details related to information elements similar to the IE 200, and to the relevant techniques for controlling beamforming session, are described in U.S. patent application Ser. No. 12/709,115, filed Feb. 19, 2010 and entitled "Techniques for Flexible and Efficient Beamforming," and in U.S. Provisional patent application No. 61/154,985, filed Feb. 24, 2009, entitled "Flexible and Efficient Beamforming Training for mmWave Systems." The entire disclosures of both of these applications are hereby incorporated herein by reference.

Next, some of the example segmented beamforming techniques are described with reference to FIGS. 5-24. An example transmitter capable of segmented beamforming is then discussed with reference to FIG. 25, and an example receiver capable of segmented beamforming is discussed with reference to FIG. 26. In the following discussion, one or several indexes and/or other parameters included in BFT units are illustrated as numbers inside the blocks depicting the corresponding BFT units for simplicity (similar to the notation used in FIG. 3A). Also, for ease of illustration, BFT units used in various embodiments discussed herein are referred to as a beamforming session with N BFT units $d_1, d_2, \ldots d_n$. However, it will be understood that this identical notation is used for ease of explanation only, and that BFT units in different embodiments are formatted differently, and that the number of BFT units in a beamforming session various according to an embodiment and/or configuration options.

Figure 5:
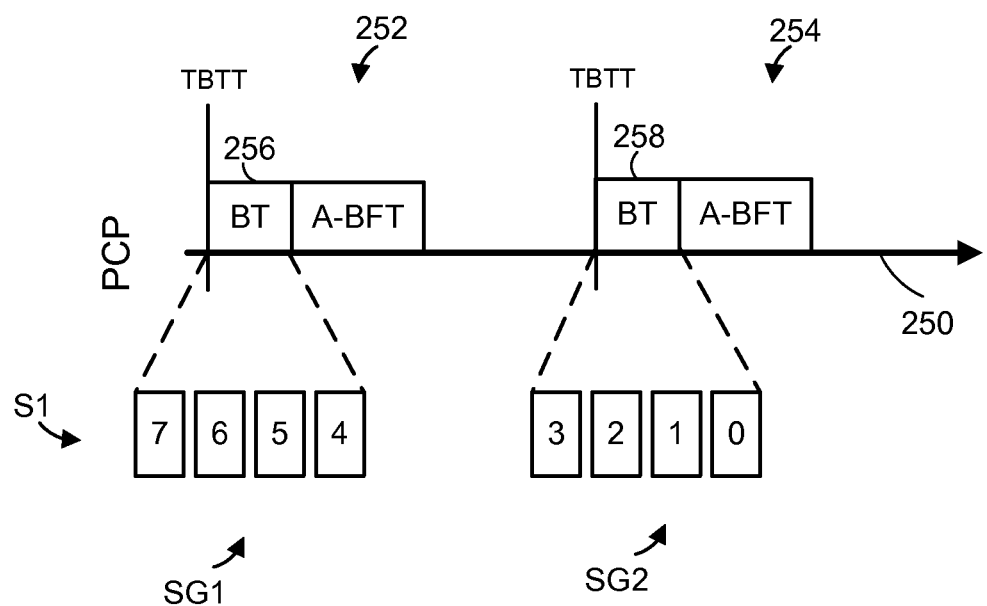
FIG. 5 illustrates a technique for segmented beamforming according to an embodiment of the present disclosure.

Referring first to FIG. 5, a beamforming session set S1 having eight BFT units $d_1, d_2, \ldots d_8$ is divided into two segments of equal size, SG1 and SG2. In this example, each BFT unit in the set S1 corresponds to a different sector, and a PCP 250 conducts one session of transmit sector sweeping over the course of two beacon intervals, 252 and 254. In particular, the segment SG1 corresponds to a BT timeslot 256 in the beacon interval 252, and the segment SG2 corresponds to a BT timeslot 258 in the beacon interval 254. In this example, the BFT units $d_1, d_2, \ldots d_8$ are discovery beacons, each including an index unique in the set S. The PCP 250 transmits the BFT units $d_1, d_2, \ldots d_8$ in the descending order of the index to define a countdown (7, 6, ... 0). Because the index uniquely identifies a BFT unit in the set S1 as well as in the corresponding segment SG1 or SG2, and because the indexes of transmitted BFT units form a sequence, the index can be understood as a global counter.

It is noted that if a new station misses the beginning of the beacon interval 252 but receives a later-in-time discovery beacon/BFT unit during the BT 256, for example, the global counter in the BFT unit is not sufficient for the new station to reliably determine the end of the beamforming segment, in at least some embodiments. For example, if the new station receives the BFT unit 5, the new station cannot determine whether the corresponding beamforming session is continuous, in which case the BFT unit 5 is immediately followed by five more BFT units, or segmented, in which case the BT 256 may end sooner (however, if the BFT unit 5 is in the last segment of a segmented beamforming session, the BFT unit 5 is still immediately followed by five more BFT units).

In another scenario, a new station begins to scan the communication channel on which the PCP 250 transmits the set S1 after the end of the BT 256 but prior to the beginning of the beacon interval 254 and the BT 258. In some embodiments, the new station can accurately determine the duration of the BT 258 based on other information provided at the beginning of the beacon interval 254 and, therefore, can determine how many BFT units are transmitted during the BT 258. However, in an embodiment, the station still cannot determine whether the BFT units transmitted in the BT 258 corresponds to a complete beamforming session or only a segment. Thus, if a station consistent with this embodiment receives the BFT unit with the index 2 that corresponds to sector 6, for example, the station does not know whether there are other sectors that are yield a better quality of communications.

In an embodiment, each BFT unit in the set S1 includes an additional flag (e.g., one bit) to indicate whether the beamforming session is continuous or segmented. Based on the value of the flag in a successfully received BFT unit, the new station in one example scenario decides to scan the channel during one or several subsequent beacon intervals to complete the beamforming session. Once the station receives a BFT unit with a larger value of the global counter (e.g., 7) than the value of the global counter (e.g., 5) in the first BFT unit received after the new station began to scan the channel, the station can determine the size of the beamforming session set S1 (e.g., by deciding, upon detecting the transition from 0 to 7, that 7 is the highest index of a BFT unit, and 8 is accordingly the size of the set S1). In another scenario, the station "settles" for the partially completed forward beamforming session and participates in the A-BFT timeslot, during which the station begins beamforming in the opposite direction. In an embodiment, a station that does not successfully receive any BFT units/discovery beacons during a BT timeslot continues to scan the channel until the station receives at least one beacon.

In an embodiment, a station that only partially completes a TxSW session from the PCP 250 compensates (at least partially) for the incomplete TxSW session by supporting transmit beam refinement from the PCP 250 in the A-BFT timeslot. In another embodiment, the station requires a complete TxSW session of the PCP 250 at a later point in time (e.g., in another timeslot, another superframe, etc.).

Figure 6A:
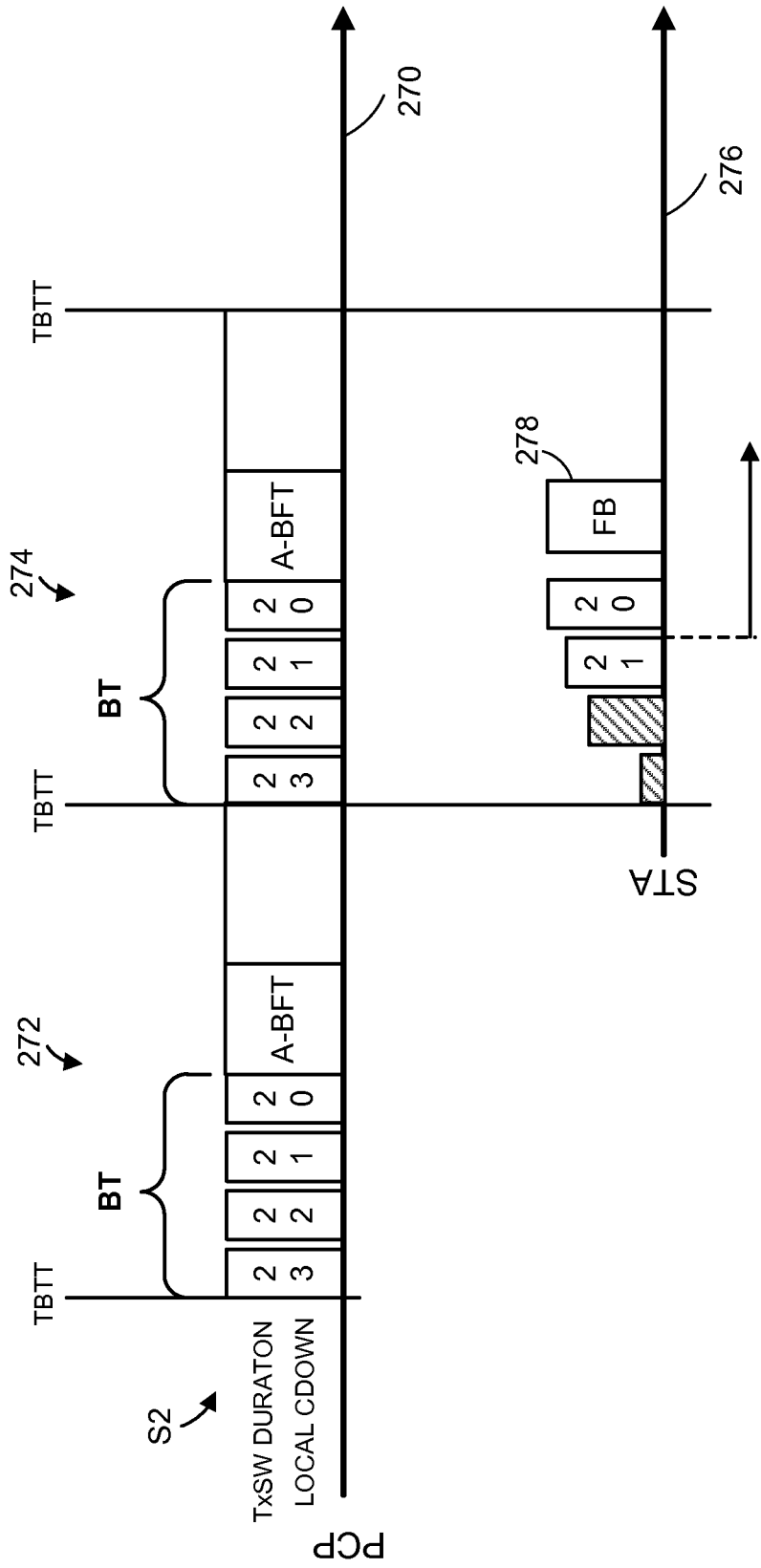
FIG. 6A illustrates a technique for segmented beamforming using a field in BFT frames that indicates the duration of a complete BFT session, in accordance with an embodiment of the present disclosure.

Now referring to FIG. 6A, each BFT unit in a set S2 includes a local counter that uniquely identifies the BFT unit in each segment, and a session duration indicator that indicates the number of segments into which the set S2 is divided. In one example, an eight-unit set S2 is divided into two four-unit segments, and the session duration indicator in each BFT unit accordingly is set to 2. The local counter of a BFT unit in each of the two segments defines a countdown from 3 to 0 in accordance with this example embodiment.

In an embodiment, a PCP 270 transmits the set S2 over two adjacent beacon intervals 272 and 274. A station 276 begins to scan the channel prior to, or at the beginning of the beacon interval 274, and successfully receives two BFT units with local counters set to 1 and 0, respectively. Based on the value of the session duration indicator (in this example, 2), the station 276 in an embodiment determines how many more BFT units the station 276 can potentially receive in the subsequent beacon intervals. In the scenario illustrated in FIG. 6A, the station 276 decides to "settle" for the partial results and transmits a feedback frame 278 to the PCP 270. It is noted that in this manner, the station 276 can efficiently control the duration of a beamforming session, and can prevent the PCP 280 from transmitting superfluous BFT units after a sufficiently good sector has been identified.

In another embodiment, the beacon intervals 272 and 274 are not adjacent. For example, to reduce the overhead, one or several beacon intervals without a BT timeslot can be scheduled between the beacon intervals 272 and 274. In an embodiment, the session duration indicator indicates how many beacon intervals, including BT-free beacon intervals, a complete beamforming training session spans. In this case, the station easily determines the time required to conduct a complete beamforming training session.

Figure 6B:
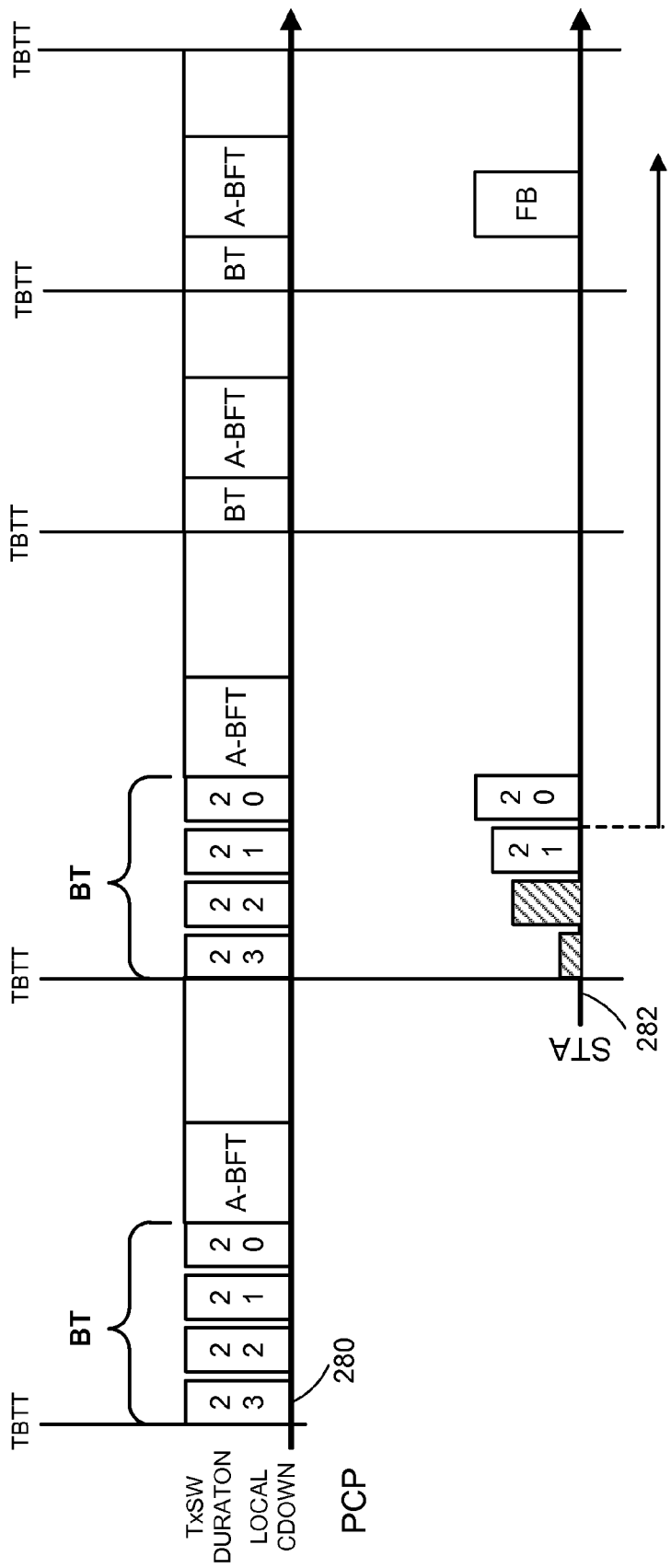
FIG. 6B illustrates another technique for segmented beamforming using a field in BFT frames that indicates the duration of a compete BFT session, in accordance with an embodiment of the present disclosure.

In another scenario illustrated in FIG. 6B, a station 282 decides to scan additional beacon intervals to complete the TxSW session of a PCP 280 or, at least, to participate in one or more additional segments of the beamforming session. In an embodiment, the PCP 280 dynamically changes the duration of a beamforming session, as measured in beacon intervals. For example, the PCP 280 in one scenario decides to select only every other sector for a TxSW session (e.g., sector 1, 3, 5 . . . ), and accordingly updates the session duration indicator.

Figure 7:
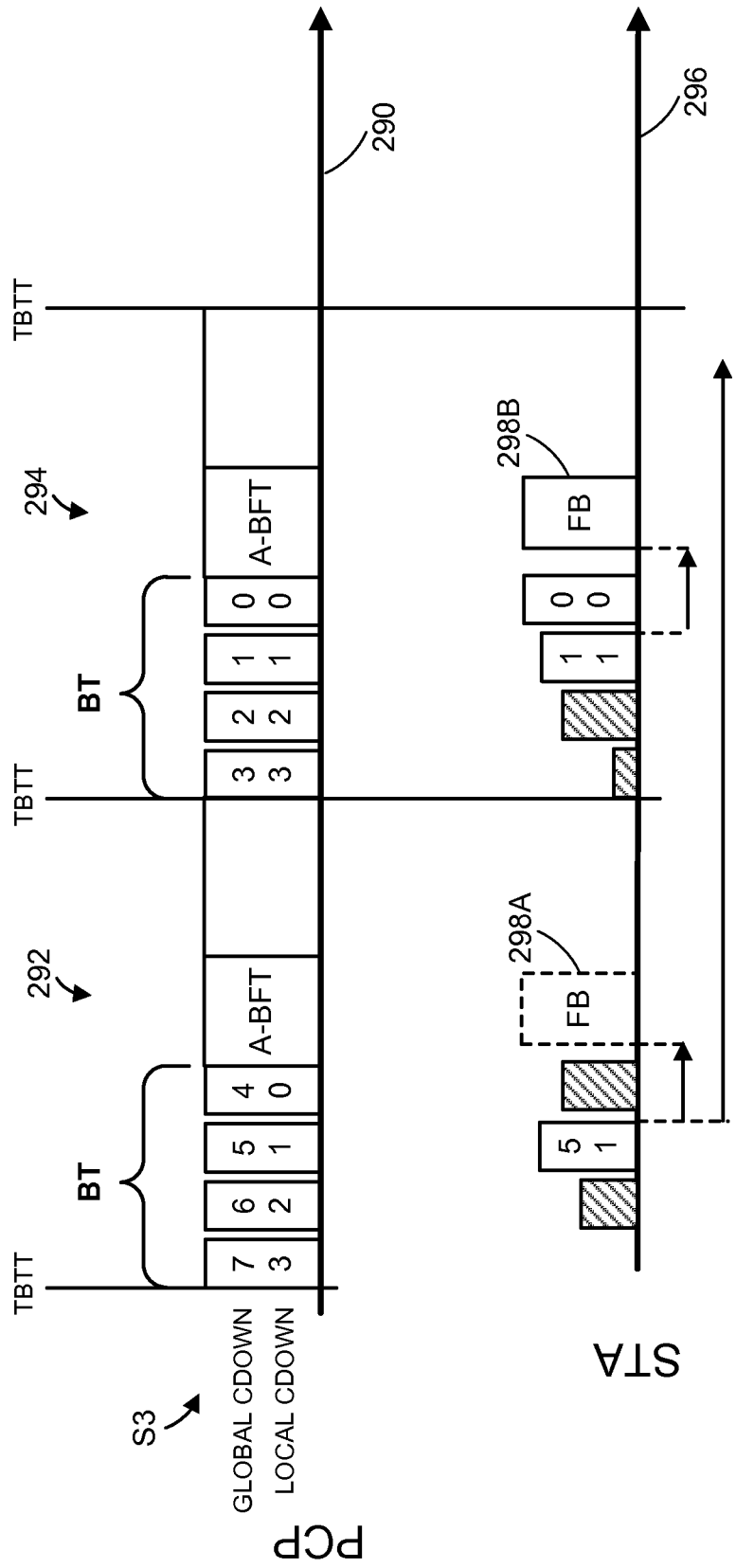
FIG. 7 illustrates a technique for segmented beamforming using a global counter and a local counter in BFT frames in accordance with an embodiment of the present disclosure.

FIG. 7 illustrates another technique for segmented beamforming in a BT timeslot. In this embodiment, each BFT unit in a set S3 includes a local counter that uniquely identifies the BFT unit in each segment, and a global counter that uniquely identifies the BFT unit in the set S3. In this example, the eight-unit set S3 is divided into two four-unit segments, and a PCP 290 transmits the segments during beacon intervals 292 and 294. Similar to the embodiment considered above, the local counter of a BFT unit in each of the two segments defines a countdown from 3 to 0.

As schematically depicted in FIG. 7, when a station 296 receives the BFT with the global counter set to 5 and the local counter set to 1, the station 296 determines, on the one hand, how many BFT units are yet to be transmitted in the current BT timeslot and, and, on the other hand, how many more beacon intervals the current beamforming session is scheduled to occupy. In other words, the station 296 determines when the current BT timeslot is scheduled to end as well as when the beamforming session is scheduled to end.

In some embodiments, the station 296 transmits a feedback frame 298A in the beacon interval 292 after the BT timeslot even though the station 296 knows that the beamforming session is not complete. In one such embodiment, the feedback frame 298A is interpreted as specifying the best-so-far sector, and the PCP 290 and the station 296 proceed to complete the beamforming session after which the station 296 transmits another feedback frame 298B.

Figure 8:
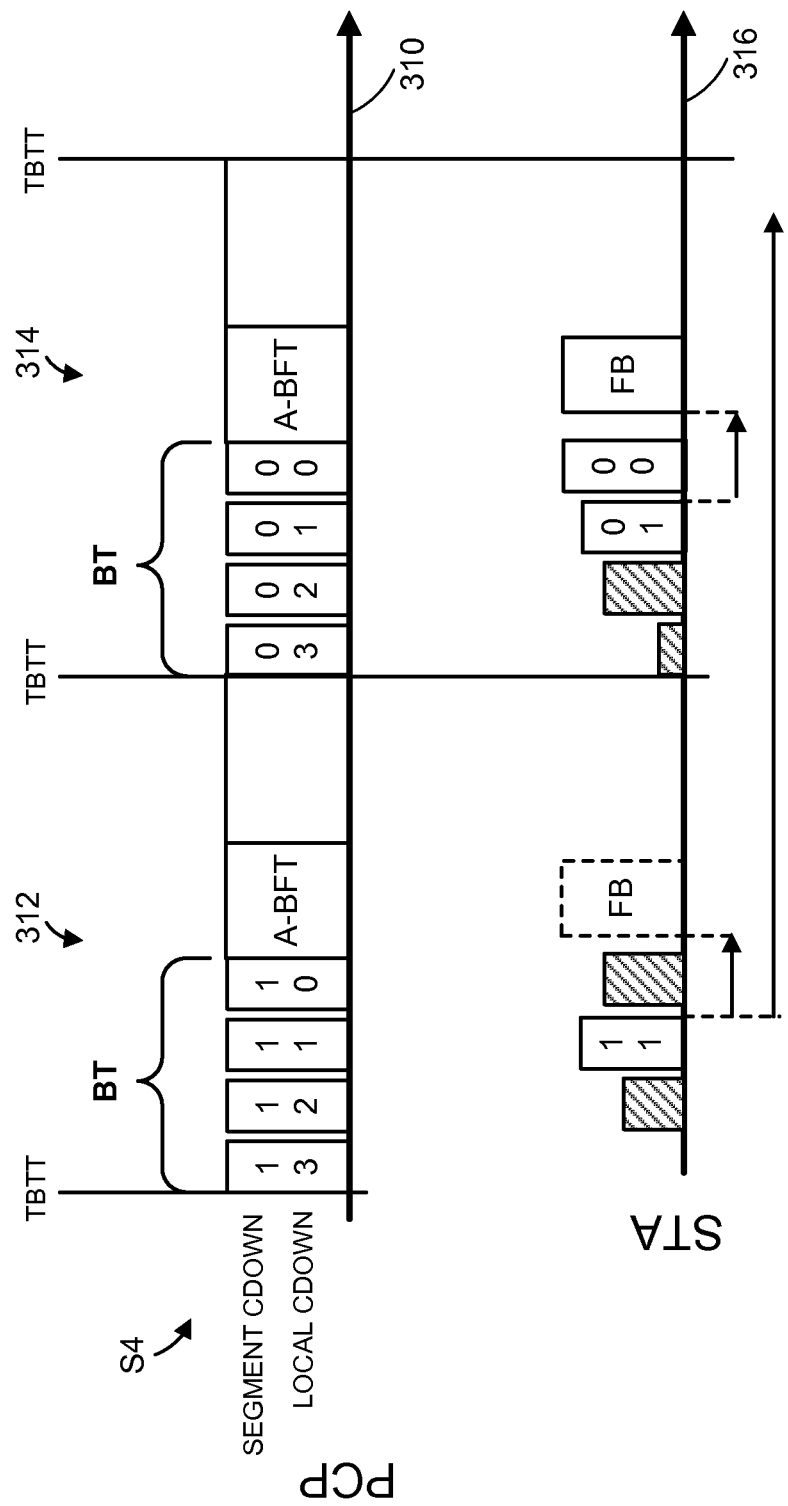
FIG. 8 illustrates a technique for segmented beamforming using a segment counter and a local counter in BFT frames in accordance with an embodiment of the present disclosure.

Referring to FIG. 8, each BFT unit in a set S4 includes a local counter that uniquely identifies the BFT unit in each segment, and a segment counter that uniquely identifies the segment in the beamforming session. In this example, the eight-unit set S4 is divided into two four-unit segments, and a PCP 310 transmits the segments during beacon intervals 312 and 314. Similar to the embodiments considered above, the local counter of a BFT unit in each of the two segments defines a countdown from 3 to 0. Further, the segment counter of the BFT units defined a countdown from 1 to 0. As in the embodiment described above with reference to FIG. 7, a station 316 provides feedback at the end of a segment, at the end of the completed beamforming session, or both.

Referring to both FIGS. 7 and 8, it is noted that, in accordance with these embodiments, if a station receives a BFT unit in the last segment of a beamforming session, the station cannot determine whether the current beamforming session is segmented or continuous. For example, if both the local counter and the global counter indicate the last BFT unit in a beamforming session set, the station does not know whether the PCP previously transmitted earlier segments of the beamforming session.

Figure 9:
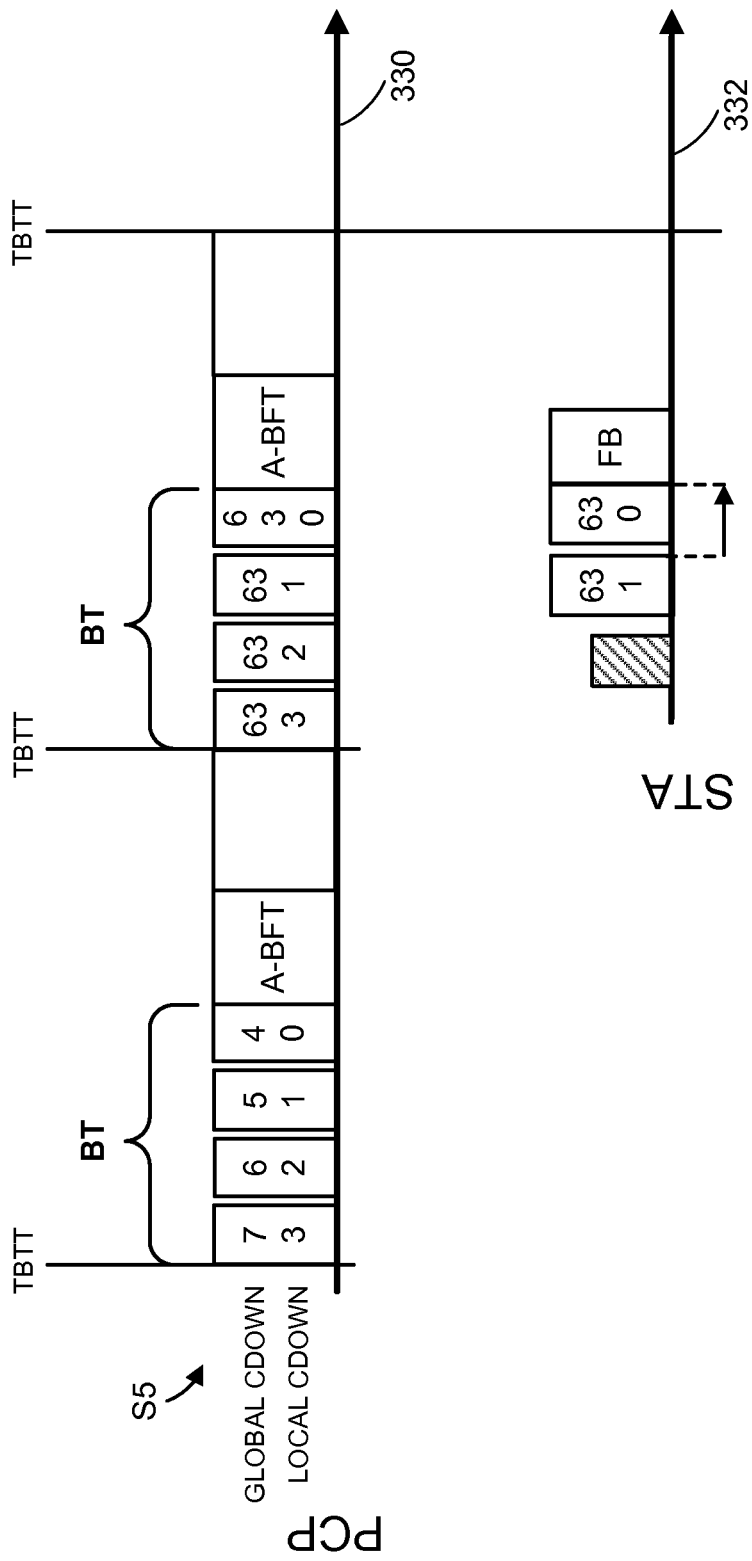
FIG. 9 illustrates a technique for segmented beamforming using a global counter, with a certain value indicating the last segment, and a local counter in BFT frames in accordance with an embodiment of the present disclosure.

Referring to FIG. 9, a PCP 330 uses a beamforming session set S5 that is similar to the set S3, except that a certain predefined value of the global countdown indicates the last segment of a segmented beamforming session. Thus, each BFT unit in the set S5 includes a local counter that uniquely identifies the BFT unit in each segment, and a global counter that uniquely identifies the BFT unit in the set S5. In this embodiment, the protocol used by the PCP 330 and a station 332 specifies that the largest value of the global counter is 63. Thus, the PCP 330 sets the global counter to 63 in each BFT unit in the last segment of a beamforming session. When the station 332 receives the data unit with the global counter set to 63 and the local counter set to 3, for example, the station 332 is able to determine that the global counter is being used as an identifier of the last segment of a beamforming session. On the other hand, when the station 332 receives the data unit with the global counter set to 0 and the local counter set to 3, the station 332 knows the BFT unit is being transmitted during a continuous beamforming session.

Figure 10:
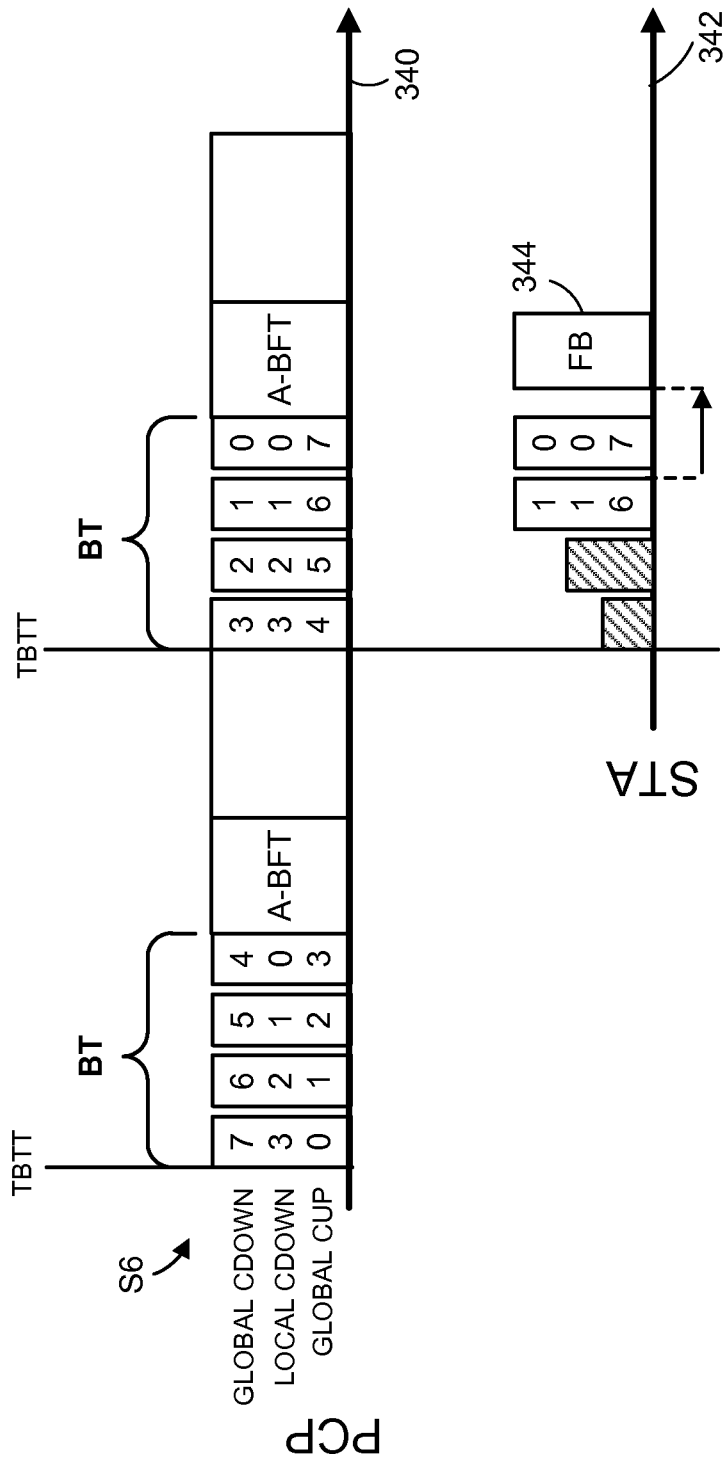
FIG. 10 illustrates a technique for segmented beamforming using a global down counter, a global up counter, and a local counter in BFT frames in accordance with an embodiment of the present disclosure.

In other embodiments, a dedicated field is used in addition to a local counter and a global counter (or segment counter). Referring to FIG. 10, for example, each BFT unit in a set S6 includes a local counter that uniquely identifies the BFT unit in each segment, a first global counter that uniquely identifies the BFT unit in the set S6, and a second global counter that uniquely identifies the BFT unit in the set S6, but counts in the direction opposite to the first global counter. In this example, the local counter of a BFT unit defines a countdown from 3 to 0, the first global counter defines a countdown from 7 to 0, and the second global counter defines a count up from 0 to 7. It is noted that the three counters unambiguously indicate whether the beamforming session is continuous or segmented and, if segmented, the number of remaining BFT units in the segment and in the beamforming session. As illustrated in FIG. 10, a station 342 in this example receives from a PCP 340 a BFT unit with the values 1, 1, and 6 corresponding to the local counter, the first global counter, and the second global counter respectively. Based on these three counters, the station 342 determines the end of the beamforming session and transmits a feedback frame 344.

In an embodiment, a field included in each BFT unit specifies the total number of sectors in addition to a local counter and a global counter. Thus, an example BFT unit indicates that it corresponds to a sector 5 out 16, and a station accordingly can determine how many additional beacon intervals, if any, must be processed to complete a beamforming session.

Figure 11A:
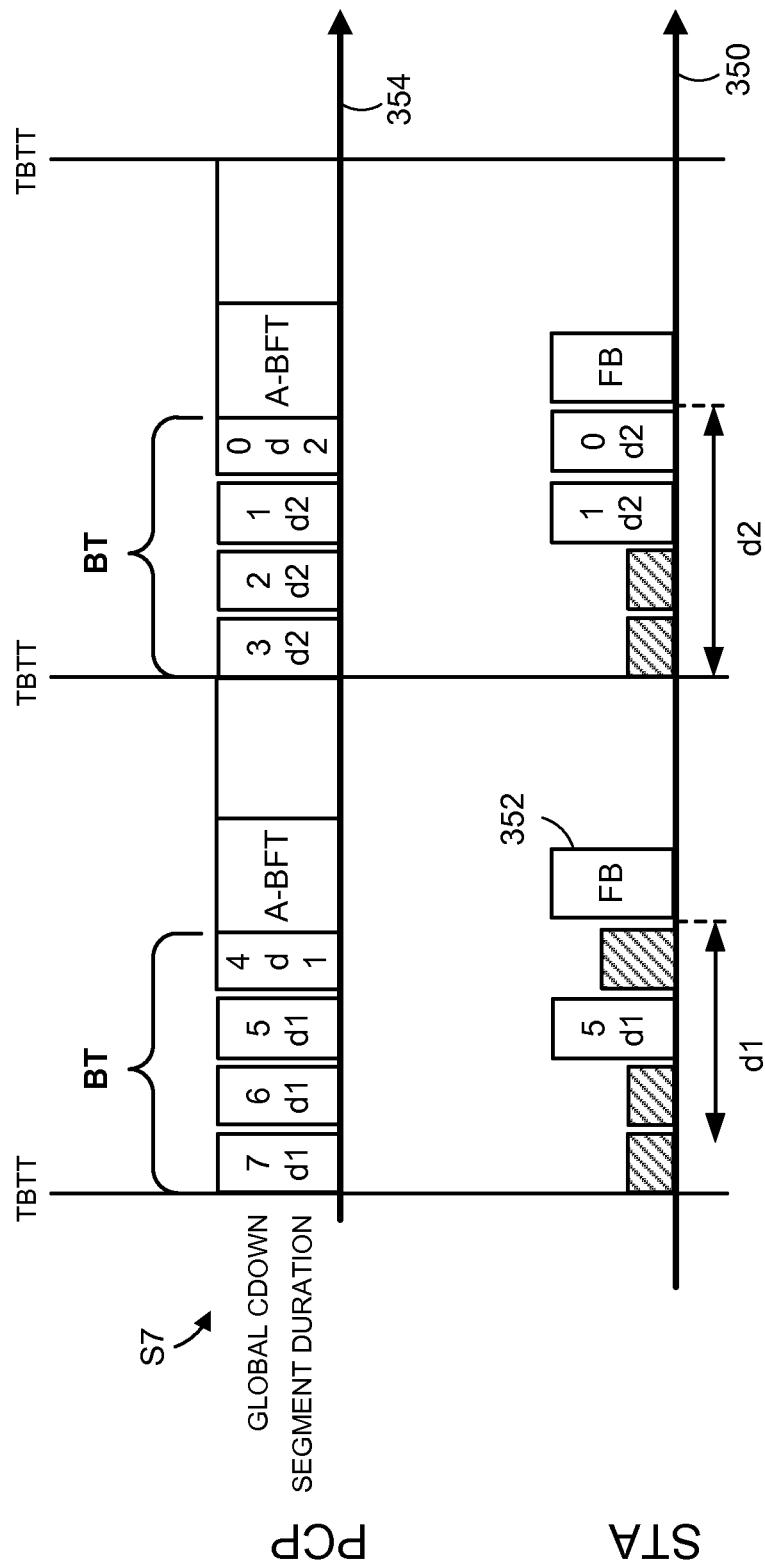
FIG. 11A illustrates a technique for segmented beamforming using a field in BFT frames that indicates the duration of a beacon time (BT) period, in accordance with an embodiment of the present disclosure.

In the embodiment illustrated in FIG. 11A, each BFT unit in a set S7 includes a global counter that uniquely identifies the BFT unit in the set S7, and a segment duration indicator d1 or d2 that specifies the duration of the BT interval during which the BFT unit is transmitted relative to the beginning of the beacon interval. Using the segment duration indicator d1 or d2, a station 350 in an embodiment determines the beginning of an A-BFT timeslot during which the station 350 transmits a feedback (e.g., best-so-far) frame 352 to a PCP 354.

Figure 11B:
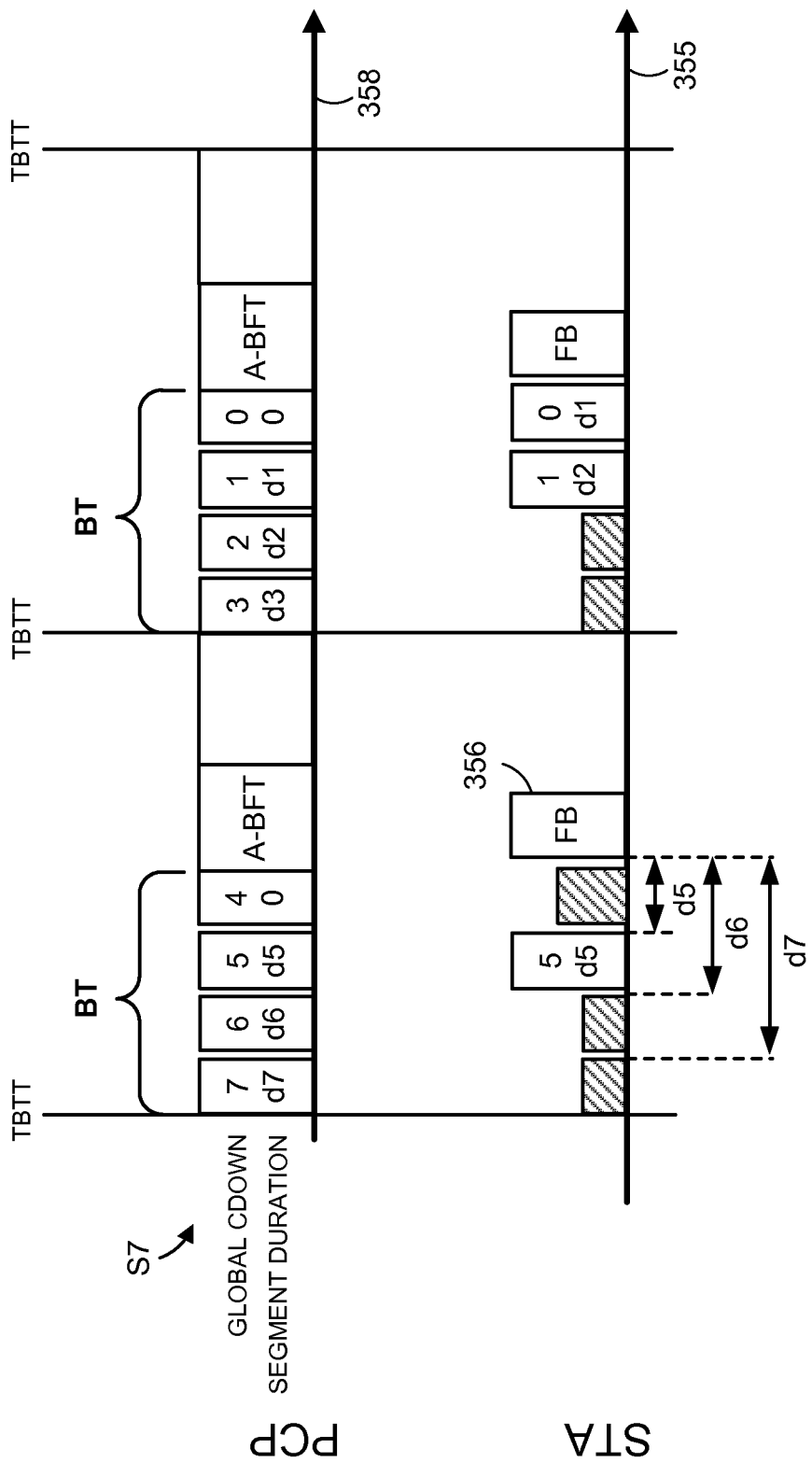
FIG. 11B illustrates a technique for segmented beamforming using a field in BFT frames that indicates the time remaining in a beacon time (BT) period, in accordance with an embodiment of the present disclosure.

In another embodiment illustrated in FIG. 11B, a segment duration indicator $d_n$, specifies the amount of time left until the end of the BT time interval. Thus, the BFT unit with the index 7 specifies the interval d7, the BFT unit with the index 6 specifies a shorter interval d6, etc. Using the segment duration indicator $d_n$, a station 355 in an embodiment determines the beginning of an A-BFT timeslot during which the station 355 transmits a feedback (e.g., best-so-far) frame 356 to a PCP 358.

Although some of the techniques were discussed above with reference to particular timeslots, at least some of these techniques are generally applicable to other timeslots. For example, some or all of a global counter, a local counter, a segment counter, a segment duration indicator, etc. can be applied to BFT units in any beamforming session set used between two or more devices. Also, although FIGS. 6A-11 primarily focus on sector sweeping, these techniques are similarly applicable to beam refinement, or any other beamforming phase implemented in the corresponding communication network.

Next, FIGS. 12A-21 illustrate some of the techniques applicable to beamforming in an A-BFT timeslot. In at least some of the scenarios discussed below, a PCP has completed a portion or the entirety of a TxSW session between the PCP and a station, and the station now originates a segmented beamforming session in the opposite direction. Similar to a PCP beamforming during a BT timeslot, the station iteratively applies transmit steering vectors $u_1, u_2, \ldots u_n$ to the antenna array of the station as N respective BFT units $d_1, d_2, \ldots d_n$, (defining a beamforming set S) are transmitted. Also similar to a PCP, the station in some scenarios conducts sector sweeping, and in other scenarios conducts beam refinement.

In an embodiment, a station does not have direct control over scheduling a superframe for a certain beacon interval. In other words, the station cannot directly control the duration of BT, A-BFT, and other timeslots. Instead, the station segments a beamforming session in view of scheduling decisions made by a corresponding PCP.

Figure 12A:
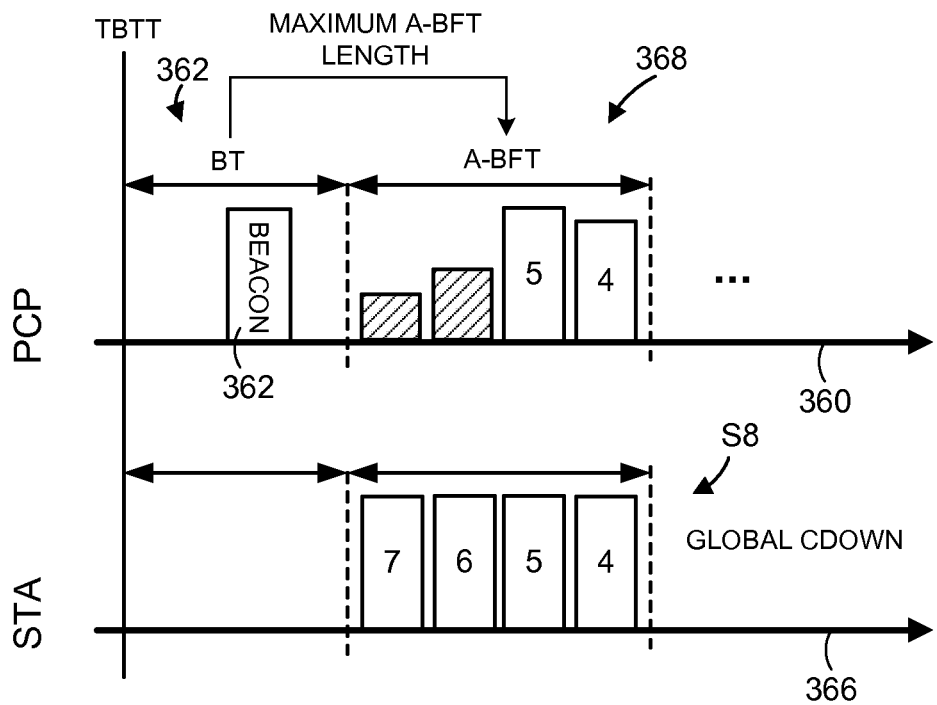
FIG. 12A illustrates a technique for segmented beamforming that includes indicating the maximum allowed duration of an association beamforming training (A-BFT) timeslot during a BT timeslot in accordance with an embodiment of the present disclosure.

Referring first to FIG. 12A, a PCP 360 specifies the maximum allowable length of an A-BFT timeslot in a beacon 362 transmitted during a BT timeslot 364. In an embodiment, the beacon 362 is a BFT unit transmitted as a part of a TxSW session. Based on the limit specified in the beacon 362, a station 366 determines how a beamforming session set should be segmented during a TxSW session in the direction from the station 366 to the PCP 360. In the example illustrated in FIG. 12A, the station 366 determines that the duration of the A-BFT 368 scheduled by the PCP 360 accommodates four BFT units. Accordingly, the station 366 transmits an eight-unit beamforming set S8 to the PCP 360 over the period of two beacon intervals (one shown).

Figure 12B:
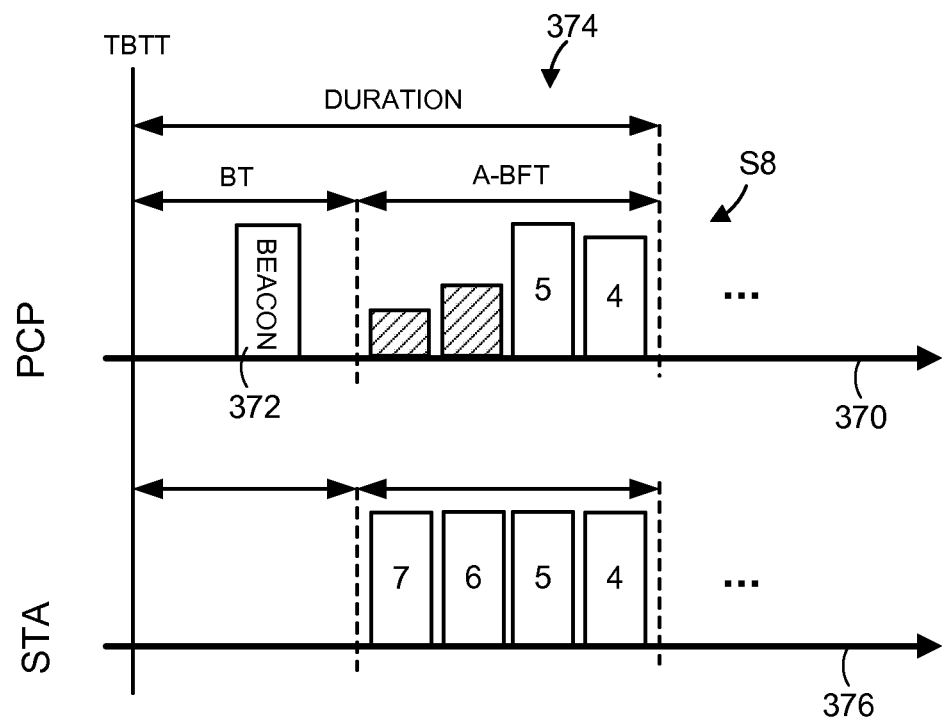
FIG. 12B illustrates a technique for segmented beamforming that includes indicating the latest ending time of an A-BFT timeslot during a BT timeslot in accordance with an embodiment of the present disclosure.

In an embodiment illustrated in FIG. 12B, a PCP 370 transmits a beacon 372 that includes a duration field specifying the latest ending time of a BFT timeslot 374. A station 376 determines how a beamforming session, such as a TxSW session to obtain an efficient transmit vector for the antenna array of the station 376, should be segmented. In this example, the PCP 370 also uses the beamforming set S8.

In various embodiments consistent with FIGS. 12A and 12B, each BFT unit in the set S8 includes one or more of a global counter, a local counter, a second global counter counting in the opposite direction relative to the first global counter, a single bit indicating whether the beamforming session is segmented, etc. The PCP 360 or 370 uses this information to determine when a particular segment of the beamforming session being conducted by the station 366 or 376 ends.

Figure 13:
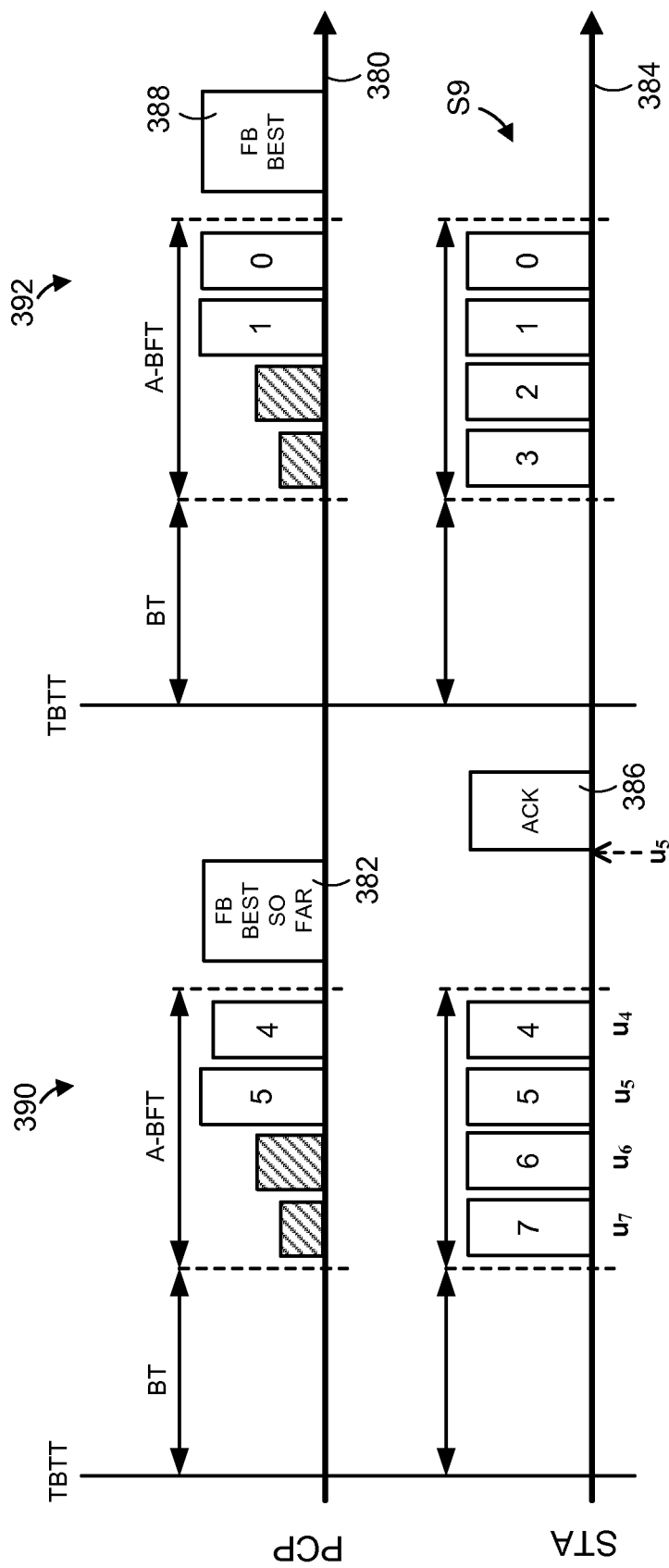
FIG. 13 illustrates a technique for segmented beamforming during an A-BFT timeslot that includes providing feedback regarding a partially BFT session in accordance with an embodiment of the present disclosure.

Further, as illustrated in FIG. 13, a PCP 380 in an embodiment transmits a sector feedback frame 382 that specifies the best-so-far sector. In an embodiment, the PCP 380 transmits the frame 382 during an AT timeslot. A station 384 responds to the feedback frame 382 with an acknowledgement 386 using the steering vector in accordance with the received feedback (e.g., using the vector $u_5$ if the feedback frame 382 indicates that the best-so-far quality of reception corresponds to the BFT unit 5 transmitted using the vector $u_5$). Further, in some embodiments, the PCP 380 and the station 384 use the frames 382 and 386 to negotiate the continuation or suspension of the beamforming session currently being conducted. Referring back to FIG. 4, the PCP 380 in one scenario sets the L-TXSW-ACK field 224 to zero to request that the station 384 do not resume the segmented beamforming session in a subsequent beacon interval. In another scenario, the PCP 380 sets the L-TXSW-ACK field 224 to one to permit the station 384 to conduct at least one more segment of the beamforming session in a subsequent beacon interval. In the example in FIG. 13, the station 284 transmits a beamforming session set S9 over the course of two beacon intervals, 390 and 392, and receives a feedback frame 388 with a sector selection related to the entire beamforming set S9.

In some embodiments consistent with FIG. 13, the station 384 continues to listen to frames from the PCP 380 for the rest of the beacon interval 390. In an example scenario, the PCP 380 announces an allocation of a BFT period during which the station 384 can finish the beamforming session or, in another embodiment, conduct one or more further segments of the beamforming session. In an embodiment, the station 384 listens to announcements from the PCP 380 during the beacon interval 390 and, if necessary, during the subsequent beacon intervals. In various scenarios, the station 384 obtains one or more BFT periods to finish the beamforming session in the form of a period allocated dynamically in response to a grant request, a dynamically negotiated contention-based period (CBP) timeslot, an SP explicitly allocated by the PCP 380 in the beacon interval 390, an SP allocated by the PCP 380 in the beacon interval 390 or a later beacon interval such as the beacon interval 392, etc.

Figure 14:
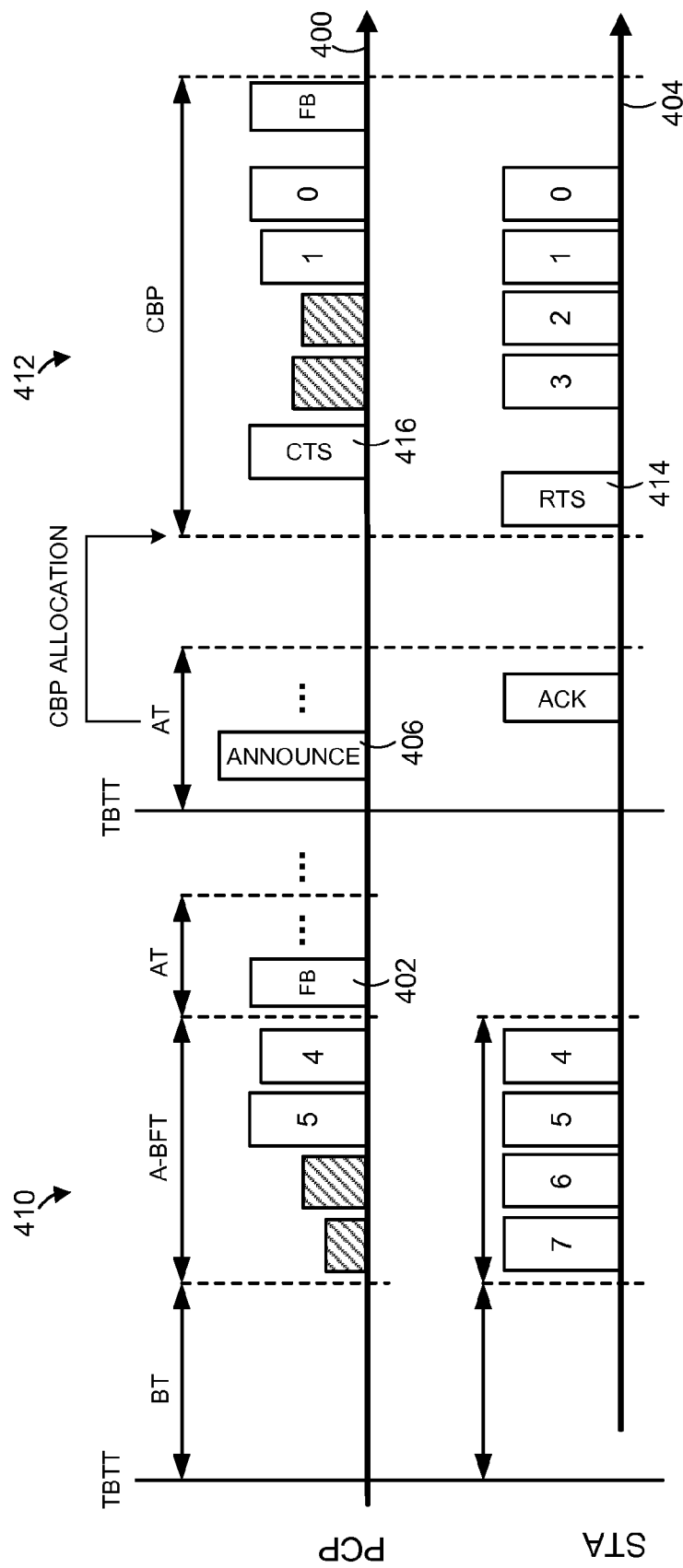
FIG. 14 illustrates a technique for segmented beamforming during a contention-based period (CBP) in accordance with an embodiment of the present disclosure.

By way of one specific example, FIG. 14 illustrates a PCP 400 that transmits a feedback frame 402 to a station 404 upon receiving one or more BFT units as a segment of a beamforming session of the station 404. Once the station 404 receives the feedback frame 402, the station 404 begins to wait for an announcement frame or a time period grant frame that would indicate when the station 404 can continue, or attempt to continue, the segmented beamforming session. In an embodiment, the PCP 400 transmits an announcement frame or time period grant frame 406 during the AT timeslot in a beacon interval 412 subsequent to a beacon interval 410 during which the station 404 conducted the first segment of the beamforming session. It is noted that in some embodiments, the beacon intervals 410 and 412 are not adjacent. Further, in some embodiments, the frame 406 is transmitted during the AT timeslot of the beacon interval 410 or another beacon interval.

The announcement or time period grant frame 406, in accordance with one embodiment, indicates an allocation of a CBP during which the station 404 competes for a BFT period. The station 404 transmits a request-to-send (RTS) frame 414 and, upon receiving a clear-to-send (CTS) frame 416, proceeds to conduct another segment of the segmented beamforming session.

Figure 15:
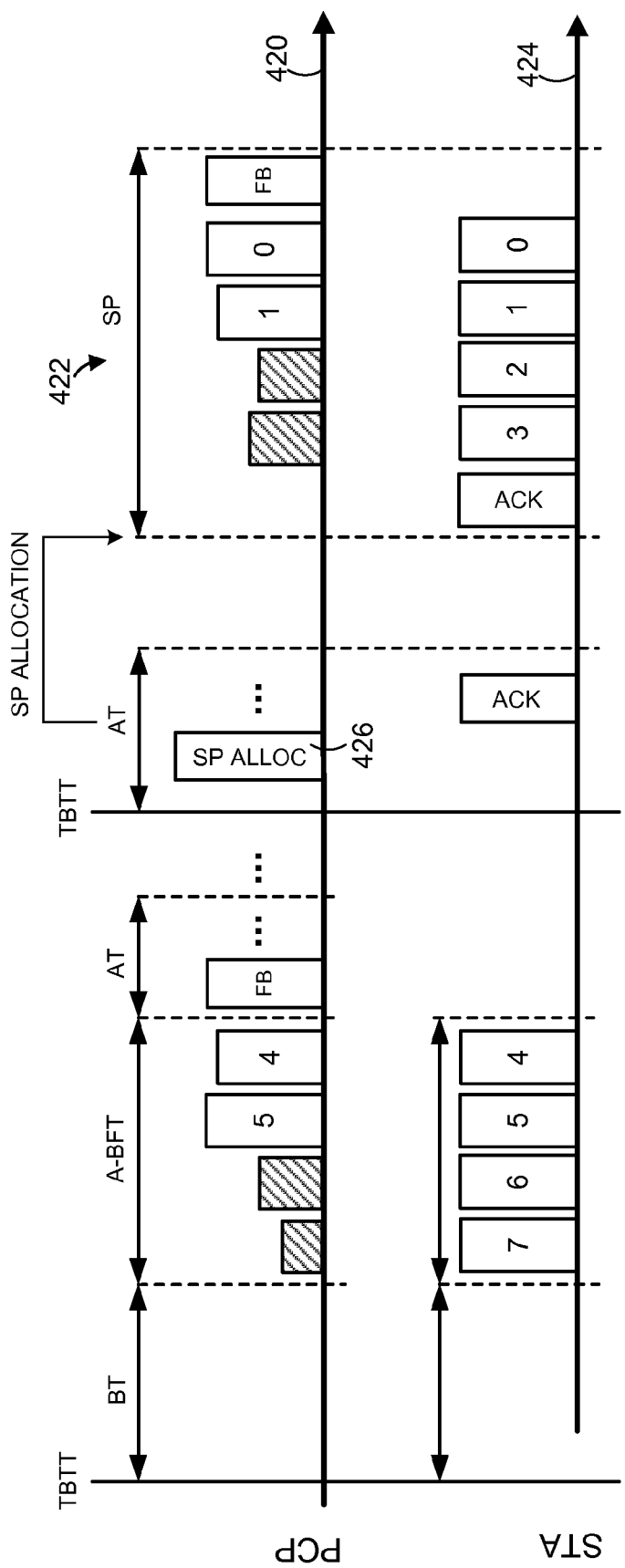
FIG. 15 illustrates a technique for segmented beamforming during an assigned service period (SP) in accordance with an embodiment of the present disclosure.
Figure 16:
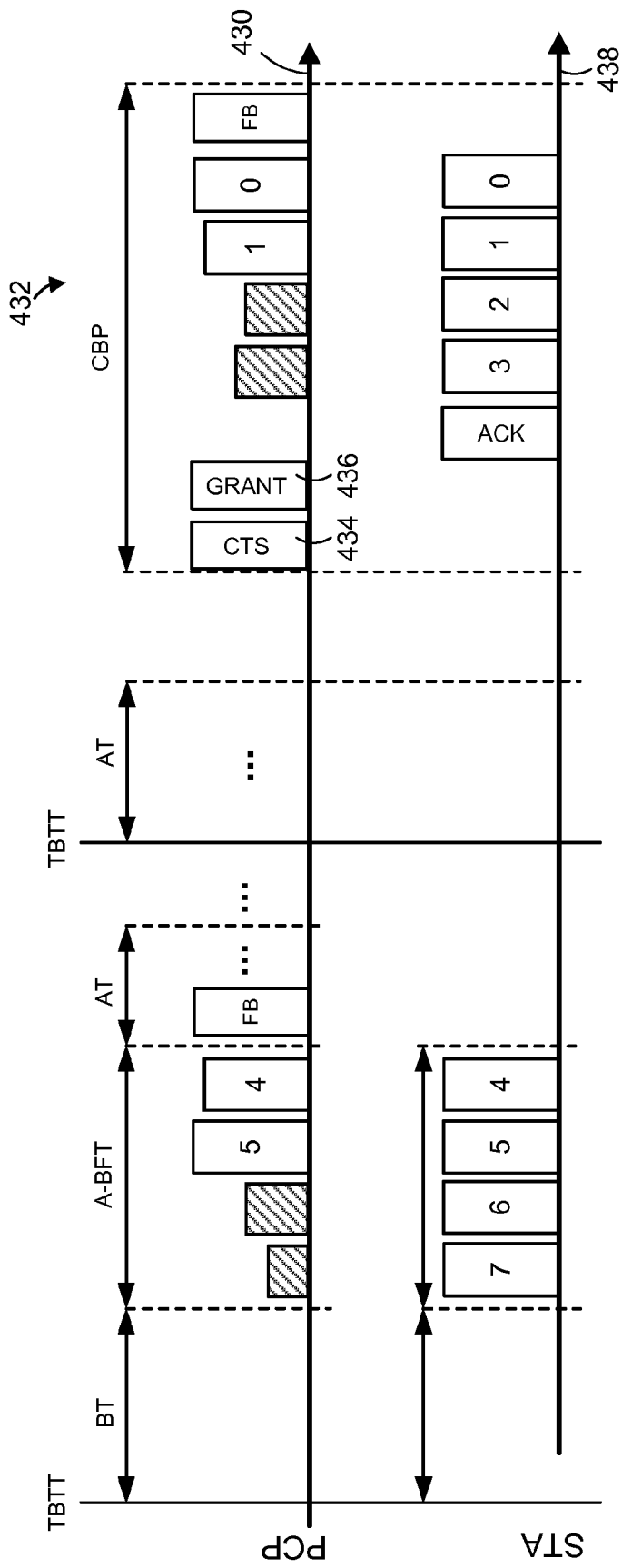
FIG. 16 illustrates another technique for segmented beamforming during a contention-based period (CBP) in accordance with an embodiment of the present disclosure.

Referring to FIG. 15, a PCP 420 in another scenario explicitly allocates an SP 422 to a station 424, and announces the allocation of the SP 422 in an announcement/SP allocation frame 426.

As yet another example, a PCP 430 (FIG. 16) allocates a CBP 432 and transmits an CTS frame 434 along with a grant frame 436 to a station 438. In an embodiment, the grant frame 436 specifies the duration of the BFT period granted to the station 438 within the CBP 432. The station 438 acknowledges the grant of the BFT period and proceeds to conduct at least a segment of the beamforming session.

Figure 17:
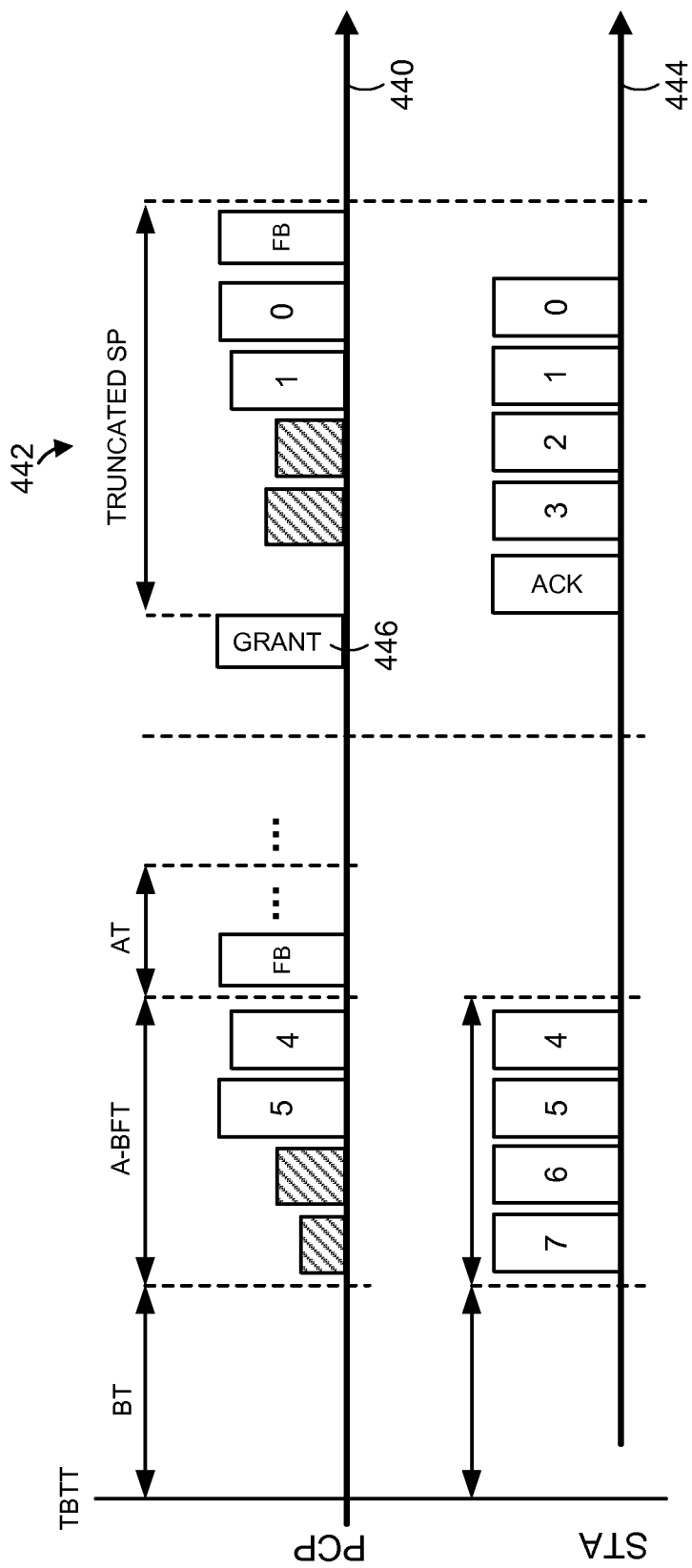
FIG. 17 illustrates a technique for segmented beamforming during a concatenated SP following a grant frame with a corresponding indicator, in accordance with an embodiment of the present disclosure.

A still further example of obtaining a BFT period following a segment of a beamforming session in an A-BFT timeslot is illustrated in FIG. 17, where a PCP 440 allocates a truncated SP 442 to a station 444. In an embodiment, a field (e.g., a single-bit flag) in a grant frame 446 indicates that the truncated SP 442 is being granted specifically for beamforming training.

Figure 18:
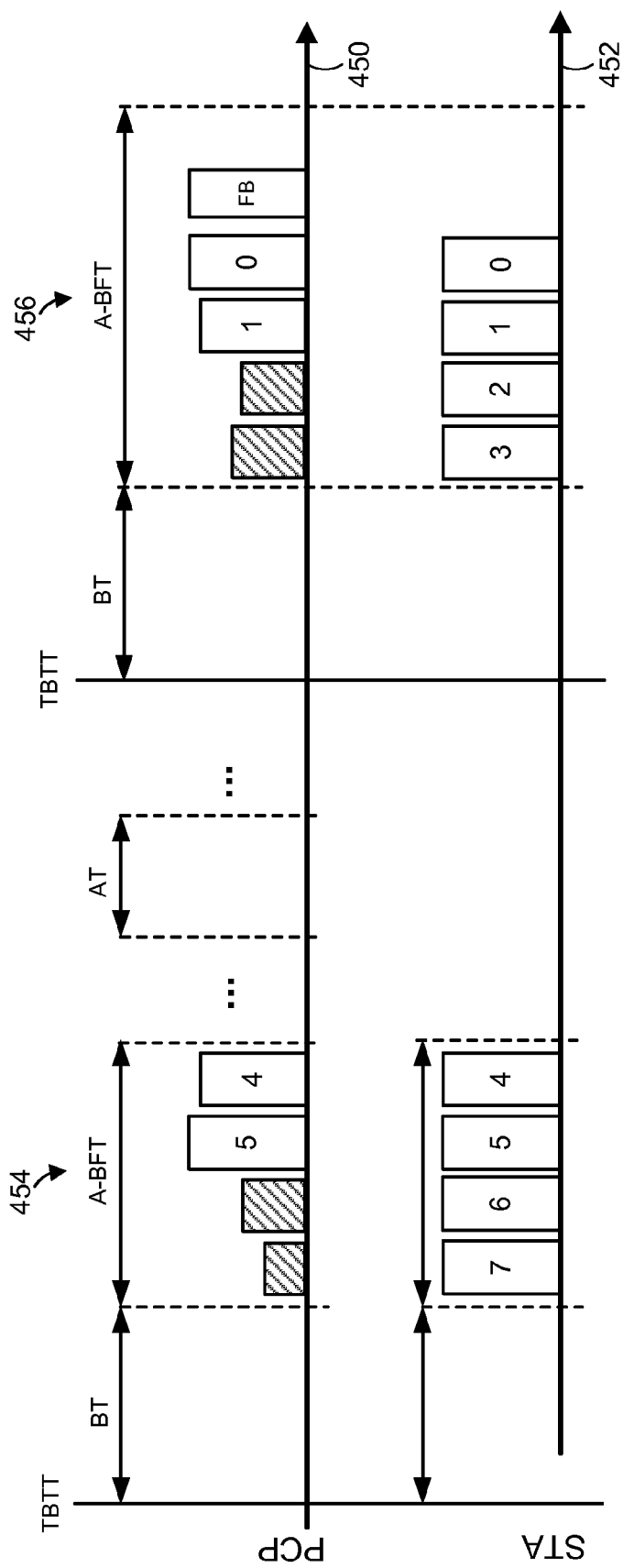
FIG. 18 illustrates a scenario in which a station beamforming in several A-BFT timeslots in the absence of a beamforming training request or an allocation of an SP from a piconet central point (PCP), in accordance with an embodiment of the present disclosure.

Referring to FIG. 18, in an embodiment, a station 452 that does not receive a BFT allocation (e.g., an announcement frame similar to the frame 426 illustrated in FIG. 15) or a beamforming request (e.g., a receive sector sweeping request) from a PCP 450 following a segment of a beamforming session in an A-BFT timeslot 454, conducts the next segment of a segmented beamforming session in a next A-BFT timeslot 456. In an embodiment, the station 452 continues to scan the channel after the A-BFT timeslot 454 until the beginning of the A-BFT timeslot 456 so as to not miss a relevant announcement frame or a time period grant frame from the PCP 450.

In some embodiments described with reference to FIG. 19, a PCP 460 supports parallel segmented beamforming sessions conducted by stations 462 and 464. In an embodiment, an A-BFT timeslot 466 is divided into several sector sweep (SS) sub-timeslots 1, 2, ... L. The stations 462, 464, and 469 "back off" by a random number of SS sub-timeslots prior to beginning a beamforming session, in accordance with some embodiments. In an example scenario, the stations 462 and 464 transmit the respective beamforming session sets S10 and S11 in a slot N, each starting the transmission at the beginning of the slot, after backing off by the same (zero) number of timeslots; meanwhile, the station 469 backs off by one timeslot and accordingly begins its beamforming session in the slot N+1. In an embodiment, the sets S10 and S11 are associated with transmit sector sweeping. The PCP 460 receives one of the BFT units in the set S10 and one of the BFT units in the set S11. The PCP 460 then transmits feedback frames 468 and 470 to the stations 462 and 464, respectively. In each case, the PCP 460 provides feedback based on only partial results of beamforming, as the beamforming session sets S10 and S11 may partially collide in the slot N.

In an embodiment, the feedback frame 468 indicates that the station 462 should not attempt to redo beamforming using the entire set S10 or a segment thereof. The feedback frame 468 in this cases specifies which of the successfully received BFT units is associated with an acceptable quality (e.g., BFT unit 0). In another embodiment, the feedback frame 468 indicates that the station 462 should not attempt to beamform within the A-BFT timeslot 466, and should instead redo or resume beamforming in an DTT timeslot. In response, the station 462 begins a new TxSW session in the DTT in accordance with one embodiment or, in another embodiment, resumes a segmented beamforming session in the DTT. In another embodiment, feedback frame 468 indicates that the station 462 should redo (or resume) the beamforming session in another SS timeslot (e.g., slot N+1).

Figure 19:
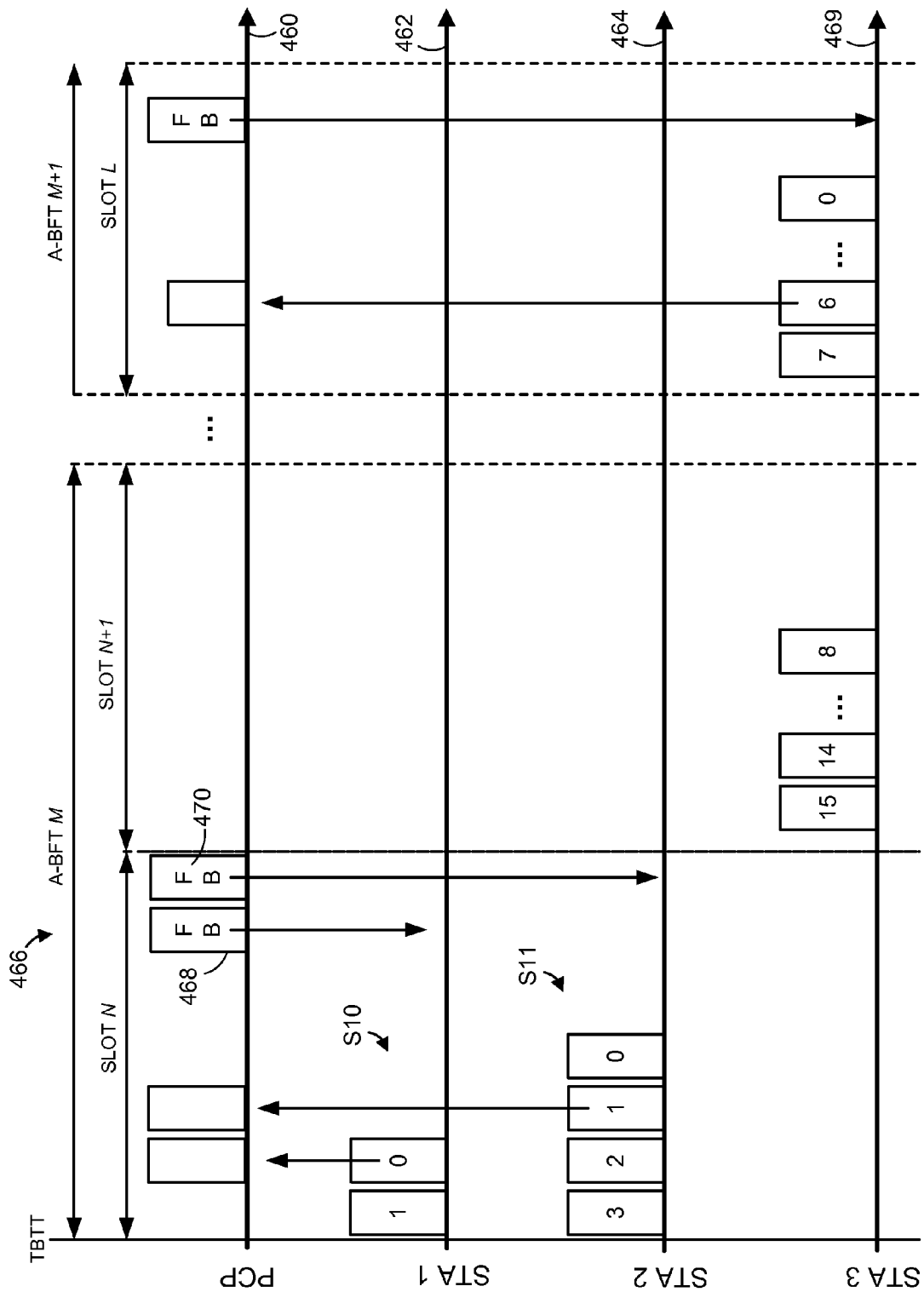
FIG. 19 illustrates a technique for segmented beamforming between a PCP and several stations in accordance with an embodiment of the present disclosure.

By way of another example, FIG. 19 also illustrates that a station 469 segments a beamforming session between two SS slots, where the two SS slots belong to different A-BFT timeslots. Each SS timeslot in this example accommodates eight opportunities to transmit a BFT unit, and the station 469 wishes to transmit 16 BFT units to cover 16 respective sectors. In an embodiment, the station 469 begins to transmit BFT units in the slot N+1 after backing off by a certain number of slots. In some embodiments, the back-off offset is generated randomly.

Figure 20:
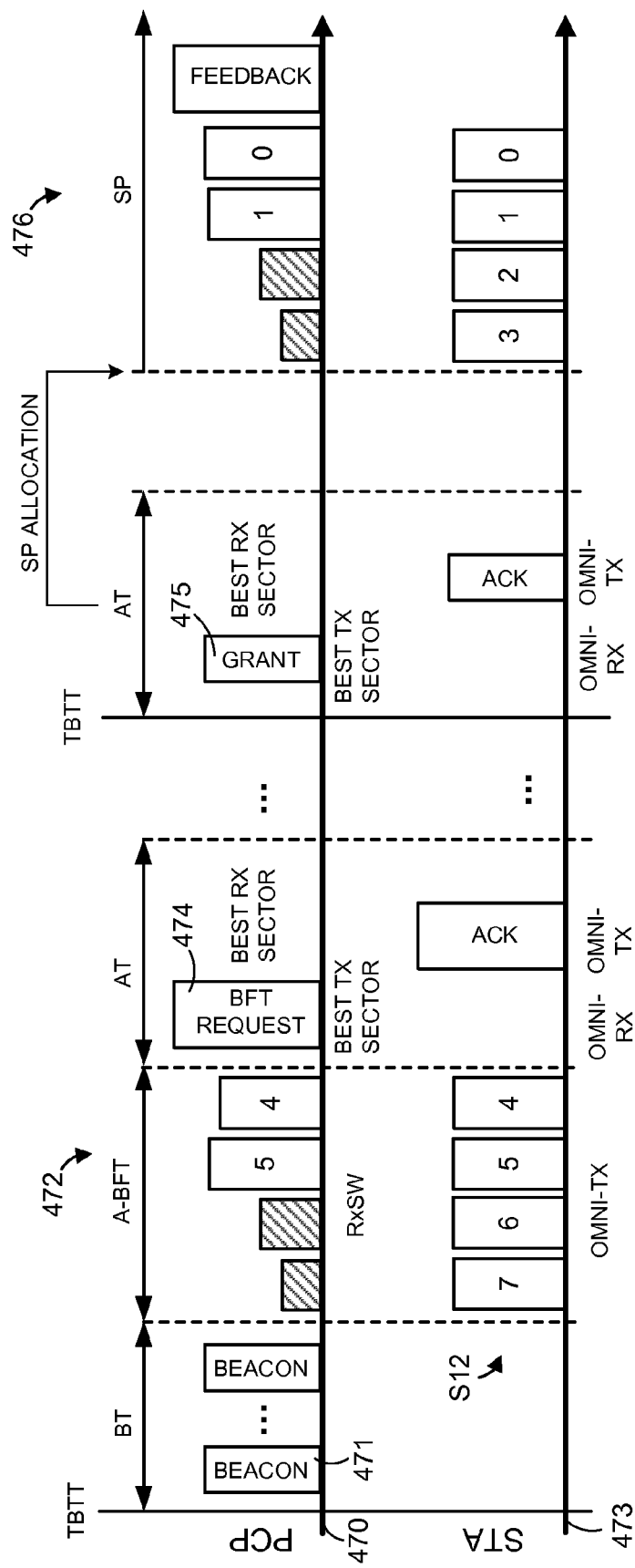
FIG. 20 illustrates a technique for segmented receive beamforming during an A-BFT timeslot and at least one other period, in accordance with an embodiment of the present disclosure.

Next, examples of segmented receive sector sweeping are discussed with reference to FIGS. 20 and 21. A PCP 470 illustrated in FIG. 20 announces, in beacons 471, that the PCP 470 wishes to conduct receive sector sweeping (RxSW) during the A-BFT timeslot 472. Similar to some of the examples discussed above, the beacons 472 specify a limit on the duration of the A-BFT 472 (or the number of BFT units to be transmitted during the A-BFT 472). However, in an embodiment, a station 473 transmits each of the BFT units in a set S12 using the same omni-mode steering vector, while the PCP 470 iteratively applies different steering vectors to its antenna array as BFT units in the set S12 are received. Following a segment of an RxSW beamforming session, the PCP 470 transmits a BFT request 474 to guide the station 473 with respect to the remainder of the beamforming session.

In an embodiment, the PCP 470 transmits a grant frame 475 during the AT timeslot in the current beacon interval or a subsequent beacon interval. The grant frame 475 indicates the allocation of an SP 476 during which the station 473 should continue to train the receive steering vector of the PCP 470, i.e., continue the RxSW session.

In another embodiment, the BFT request 474 indicates that another BFT timeslot is allocated in the following beacon interval, and that the station 473 should transmit another subset of the set S12 during that timeslot as another segment of the beamforming session. In yet another embodiment, the station 473 receives no feedback or relevant announcements or time period grants from the PCP 470, and proceeds to conduct another segment of the beamforming session in the next A-BFT timeslot as the default option.

Figure 21:
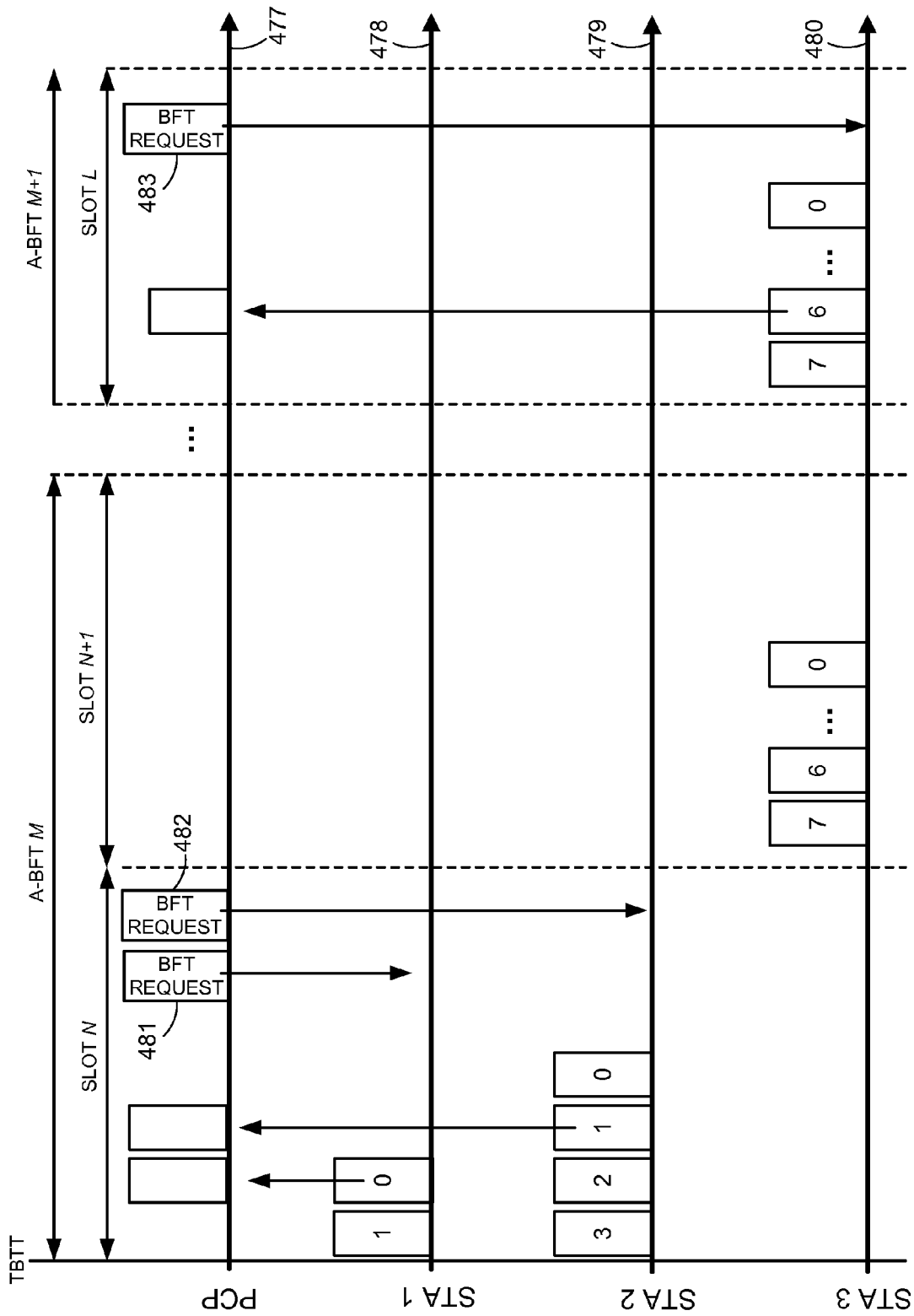
FIG. 21 illustrates a technique for segmented receive beamforming between a piconet central point (PCP) and several stations (STAs) in accordance with an embodiment of the present disclosure.

Referring to FIG. 21, a PCP 477 implements a technique to support several parallel segmented RxSW sessions that is generally similar to the parallel segmented TxSW technique described with reference to FIG. 19, except that rather than providing feedback to stations 478-480, the PCP 477 transmits BFT requests 481-483 to indicate when the respective stations 478-480 should transmit BFT units to continue the receive training of the PCP 477.

Further, segmented beamforming techniques similar to those described above can be utilized between pairs of associated stations. In some of the embodiment, a station can begin a beamforming session in an allocated BFT period (an SP, a CBP, a dynamically allocated portion of a DTT, etc.). If the station cannot complete the beamforming session, the station effectively pauses the session and attempts to resume the paused session, rather than restart the session from the beginning, in another time period (which may be of the same or different type as the initially allocated BFT period). In an embodiment, the stations attempts to use the allocated BFT as much as possible. Thus, if time remains in a BFT period after a completed TxSW session, the station initiates a beam refinement session. In an embodiment, if the station cannot complete the initiated beam refinement session, the station pauses the beam refinement session, effectively making the beam refinement session a segmented beam refinement session, and continues the session in another time period, when available. As indicated above, segments of a beamforming session need not be of the same length, and stations accordingly can utilize the available BFT periods in a highly efficient manner.

Figure 22:
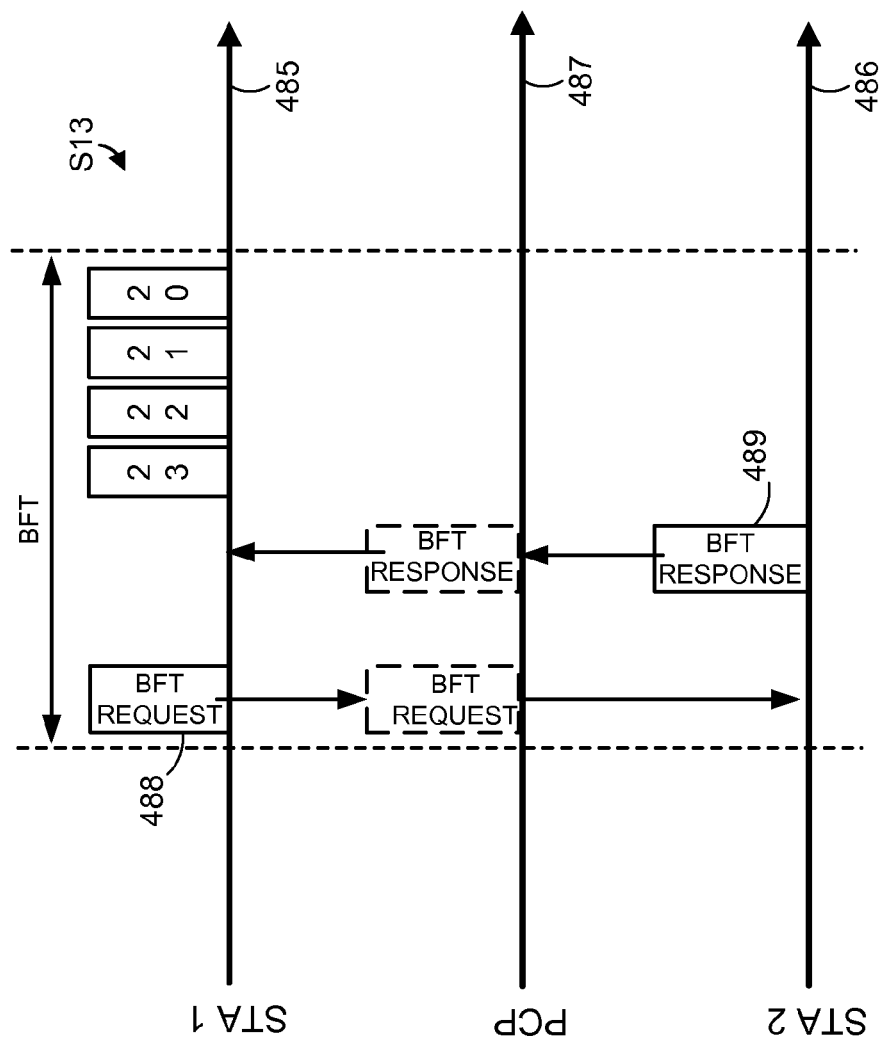
FIG. 22 illustrates a technique for segmented beamforming training between two stations associated with a PCP, in accordance with an embodiment of the present disclosure.

Referring to an example embodiment depicted in FIG. 22, stations 485 and 486 are associated with a PCP 487. The station 485 initiates a segmented TxSW session by forwarding a BFT request 488 to the station 486 via the PCP 487 during a certain BFT period. The station 486 then forwards a BFT response 489 to the station 485 via the PCP 487, and the station 485 proceeds to transmit the first segment of an eight-unit beamforming session set S13 to the station 486 in the remainder of the BFT period. In this example, the station 485 includes a local counter and a segment counter in each BFT unit in the set S13 (see FIG. 8). In general, the station 485 can use any techniques for tracking the progress of a beamforming session discussed above, e.g., estimating the end of the segment based on a segment duration indicator that specifies the amount of time left until the end of the time interval. Similarly, the station 486 determines or estimates the end of the beamforming session or of a segment using the counter and/or other indicator values using the techniques discussed with reference to FIGS. 6A-12, for example.

In another embodiment, the station 485 transmits an additional beamforming request at the end of the BFT period to negotiate allocation of another time period. In an embodiment, a BFT request includes the estimated duration of the beamforming session or an indication of how many BFT units remain in the set S13 to allow the station 486 (and, in some cases, the PCP 487) to properly plan subsequent timeslots and/or beacon intervals. In some embodiments, stations also exchange BFT request and response frames during AT timeslots to synchronize other beamforming training steps.

In an embodiment, a technique for segmented receive beamforming between a pair of stations is similar to the technique for segmented transmit beamforming between a pair of stations. In some embodiments, each BFT unit transmitted during a receive sector sweeping or beam refinement session includes a global counter or a similar indicator so that the peer station can estimate the duration of the beamforming session (or a segment thereof). In an embodiment, the station whose receive antenna array is trained during the receive beamforming session transmits a response to the peer station at the end of the session to negotiate a further session (e.g., beam refinement following sector sweeping), to inform the peer station of the station's availability or capability for training in the reverse direction, etc.

Figure 23:
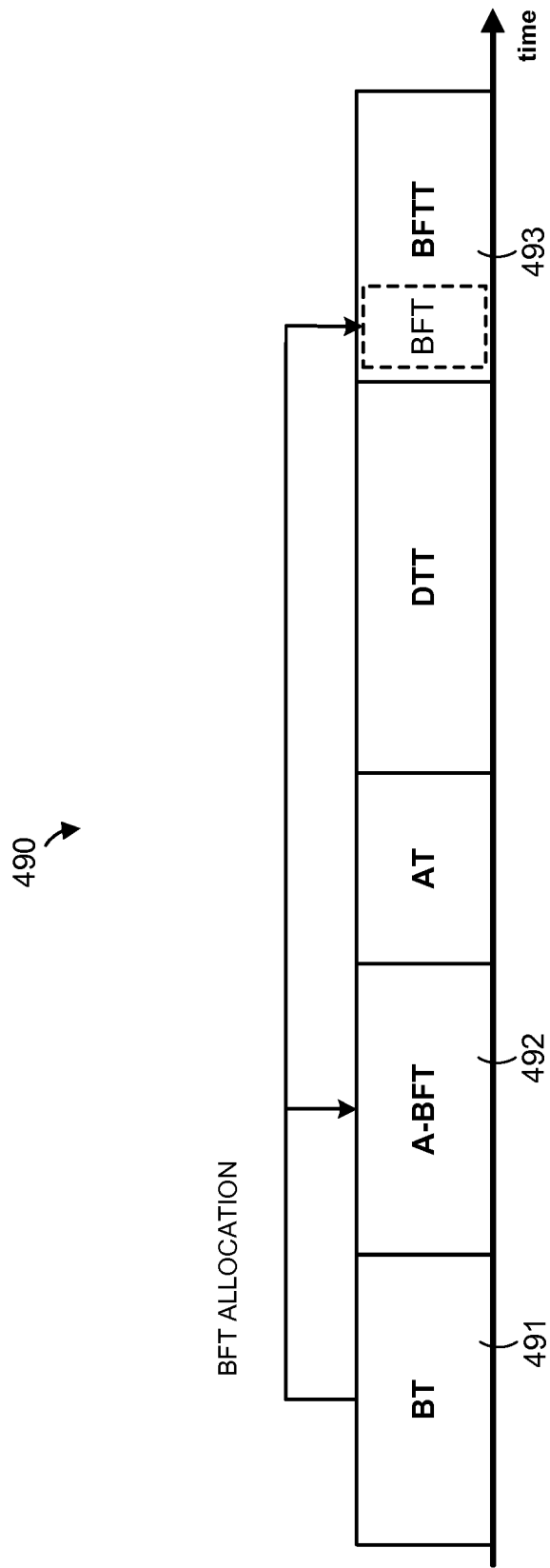
FIG. 23 illustrates a technique for segmented receive beamforming training during a beamforming training time (BFTT) between a pair stations, in accordance with an embodiment of the present disclosure.

Referring to FIG. 23, a superframe 490 includes a BT period 491, a BFT period 492, and a BFTT period 493. In an embodiment, the superframe 490 includes additional timeslots such as AT and DTT. A PCP and a station that lost a beamformed channel (or, in some cases, a pair of stations) allocate a BFT period in the BFTT period 493 for segmented beamforming that is generally similar to segmented beamforming in A-BFT discussed above. In the example scenario illustrated in FIG. 23, the timing of the BFT period is announced in a beacon during the BT timeslot 491.

It is noted that if a PCP announces a BFT period in a BFTT period during the BT timeslot 491 using beacons that correspond to BFT units of a segmented TxSW session, a station in some cases needs to scan two or more beacon intervals to complete a TxSW session with the PCP. However, if the station completes the segmented TxSW session by scanning one or more additional BT timeslots in the subsequent beacon intervals, the BFT in the BFTT period 493 allocated to the station is effectively wasted.

Accordingly, in an embodiment, if the PCP announces the allocation of a BFT in the BFTT period 493, the TxSW session in the BT 491 is a continuous beamforming session. In another embodiment, when the PCP announces the allocation of a BFT in the BFTT period 493 during a segment of a TxSW session, the station uses the allocated BFT to first complete the TxSW session of the PCP, and uses the remainder of the BFT to at least begin a TxSW beamforming session in the opposite ("reverse") direction. In one such embodiment, the PCP completes the reverse TxSW prior to transitioning to the beam refinement phase in the forward direction. In yet another embodiment, the station uses the allocated BFT to conduct a reverse TxSW session and then proceeds directly to beam refinement in the reverse direction, if time is still available in the BFT period. In another embodiment, beacons transmitted as BFT units of a TxSW session in the BT timeslot 491 do not allocate BFT periods but specify the timing of the A-BFT timeslot 492, so that one or several stations can contend for time in the BFTT timeslot 493 or use the A-BFT timeslot 492 to beamform.

Figure 24:
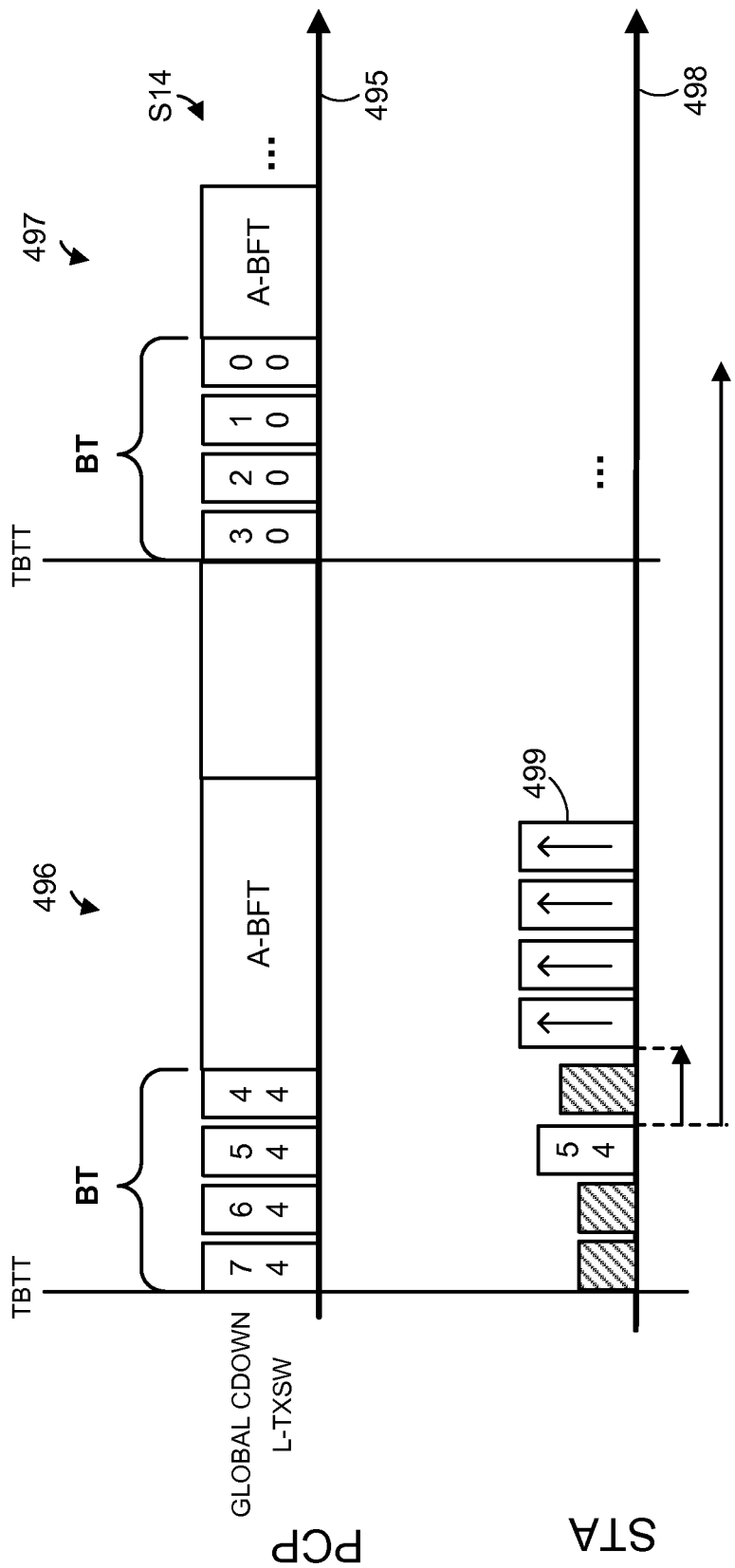
FIG. 24 illustrates a technique for segmented beamforming training using a BFT control field according to an embodiment of the present disclosure.

As indicated above, BFT units, BFT request and response, and other frames in some scenarios include a BFT control IE 200 described with reference to FIG. 4. As an additional example of using the BFT control IE 200 in a segmented beamforming procedure, FIG. 24 illustrates a PCP 495 that transmits a beamforming session set S14 over the course of two beacon intervals, 496 and 497, during a segmented TxSW procedure. In an embodiment, each BFT unit in a set S14 includes a global counter that uniquely identifies the BFT unit in the set S14. Additionally, each BFT unit in a set S14 includes the a BFT control IE, formatted similarly to the BFT control IE 200, in which the L-TXSW field specifies the number of BFT units the PCP 495 wishes to transmit during a subsequent segment. Thus, as illustrated in FIG. 24, the L-TXSW field of BFT units transmitted during the first segment associated with the beacon interval 496 is set to 4 (to indicate that four BFT units will be transmitted in the subsequent segment), and the L-TXSW field of BFT units transmitted during the second segment associated with the beacon interval 497 is set to 0 (to indicate that no further BFT units need to be transmitted).

A station 498 uses the global counter and the L-TXSW field to calculate the end of each TxSW segment. In an embodiment, the station 498 transmits frames 499 in response to the completed TxSW segment. In one scenario, the frames 499 are BFT units used for a TxSW session in the reverse direction. In an embodiment, each of the frames 499 in this case includes the BFT control IE 200 with L-TXSW-ACK set to zero to indicate that no more TxSW beamforming in the forward direction is needed. In another embodiment, station 499 transmits frames 499 as a segment feedback indication with L-TXSW-ACK set to 1 to specify that a full TxSW session is expected.

Further, in an embodiment, the PCP 495 responds to a segment of a TxSW beamforming session conducted by the station 498 in an A-BFT timeslot (i.e., reverse TxSW beamforming) with a sector feedback indication in which the L-TXSW-ACK field is set to 1 to indicate that the PCP 495 expects the station 498 to complete the reverse TxSW beamforming session. In another scenario, the sector feedback indication from the PCP 495 includes the field L-TXSW-ACK field set to zero to indicate that no more TxSW beamforming is needed. In an embodiment, the value of zero in the L-TXSW-ACK field of a sector feedback instructs the station to proceed to beam refinement.

An example transmitter and an example receiver, each capable of segmented beamforming training according to an embodiment of the present disclosure, are discussed next with reference to FIGS. 25 and 26 respectively.

Figure 25:
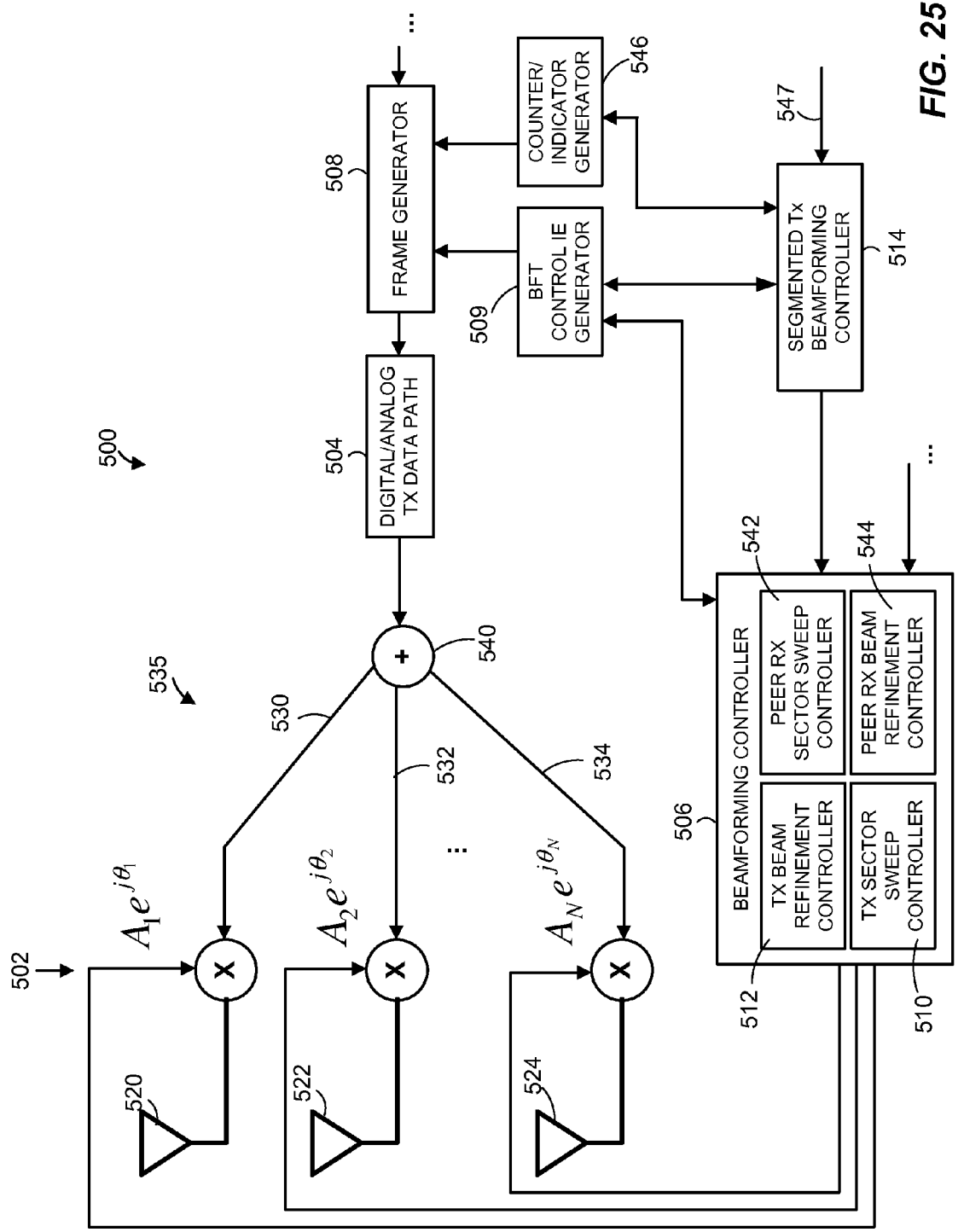
FIG. 25 is a block diagram of an example transmitter capable of segmented beamforming training according to an embodiment of the present disclosure.

FIG. 25 is a block diagram of an example transmit unit 500 that includes an antenna array 502, an analog/digital transmitter data path 504, a beamforming controller 506, a frame generator 508 to generate communication frames including BFT frames, a BFT control IE generator 509, and a segmented Tx beamforming controller 514 to control segmented receive sector sweeping and/or segmented beam refinement. The transmit unit 500 implements some or all of the techniques discussed with reference to FIGS. 1-24. In an embodiment, the beamforming controller 506 includes a transmit sector sweep controller 510 and a transmit beam refinement controller 512 to control sector sweeping and beam refinement, respectively. The beamforming controller 506 in some embodiment also includes a peer Rx sector sweep controller 542 and a peer Rx beam refinement controller 544 to generate respective sets of BFT units for peer receive training.

The antenna array 502 includes n antennas 520, 522, and 524 coupled to respective delay lines 530, 532, and 534, which may be digitally controllable and which define a beamforming network. Each of the delay lines 530, 532, and 534 can shift the signal transmitted from the corresponding antenna 520, 522, or 524 by a phase shifting angle θ. Together, the antenna array 502 and the delay lines 530, 532, and 534 define a phased array 535 of the transmit unit 500. During a transmit beamforming procedure, the beamforming controller 506 iteratively steps through a sequence of steering vectors $u_1, u_2, \ldots u_n$ as discussed above, and applies the phase shifting angles $\theta_1, \theta_2, \ldots \theta_n$ to the digitally controllable delay lines 130, 132, and 134 according to a current value of the vector u.

The antennas 520-524 share a common analog/digital transmit data path to reduce the implementation cost of the station 500. To this end, a splitter 540 may use any suitable technique to apply one signal from the transmit data path 504 to the antennas 520-524, shifted by the corresponding angles $\theta_1, \theta_2, \ldots \theta_n$. In other embodiments, each of the antennas 520-524 and the corresponding delay line 530-534 may be coupled to a separate data path. As is generally known, the analog/digital transmit data path 504 includes some or all of such components as an encoder, an interleaver, a modulator, a digital to analog converter (DAC), an inverse Fast Fourier Transform (IFFT) processing block, etc.

In operation, the segmented Tx beamforming controller 514 determines whether and how a beamforming session set should be segmented as well as how BFT units should be indexed or otherwise identified. In an embodiment, the segmented Tx beamforming controller 514 dynamically updates the size of a segment of a beamforming session, suspends a segmented beamforming session, or restart a beamforming session in view of feedback information received via a receive signal path 547.

The frame generator 508 generates BFT request frames, BFT response frames, beamforming training sequences, etc. Some of the frames generated by the frame generator 508 include a BFT control IE (such as the BFT control IE 200 discussed above) generated by the BFT control IE generator 509. To populate the fields L-TX, L-RX, L-IX-ACK, and L-RX-ACK, the BFT control IE generator 509 obtains the corresponding values from the transmit beam refinement controller 512. Similarly, the transmit sector sweep controller 510 supplies the values L-TXSW, L-RXSW, L-TXSW-ACK, and L-RXSW-ACK to the BFT control IE generator 509. Further, the BFT control IE generator 509 populates some of these fields in accordance with the status of segmented beamforming session specified by the segmented Tx beamforming controller 514.

With continued reference to FIG. 25, the transmit unit 500 in an embodiment includes a counter/indicator generator 546. The counter/indicator generator 546 generates one or several information elements or fields to be included in BFT units for identification within the corresponding beamforming session sets. In an embodiment, the counter/indicator generator 546 generates one or several of a local counter, a global counter, a session duration indicator, and other data related to BFT unit identification discussed above.

Generally with respect to the transmit unit 500, various ones of the modules 504, 506, 508, 510, and 512 can be implemented using hardware, software and/or firmware instructions executed by a processor, firmware, or combinations thereof. Moreover, some of the components 504, 506, 508, 510, and 512 may be implemented as custom integrated circuits, application-specific integration circuits (ASICs), etc., communicatively coupled by electrical busses, for example. Further, the delay lines 530-534 may be digitally or analog controllable.

Figure 26:
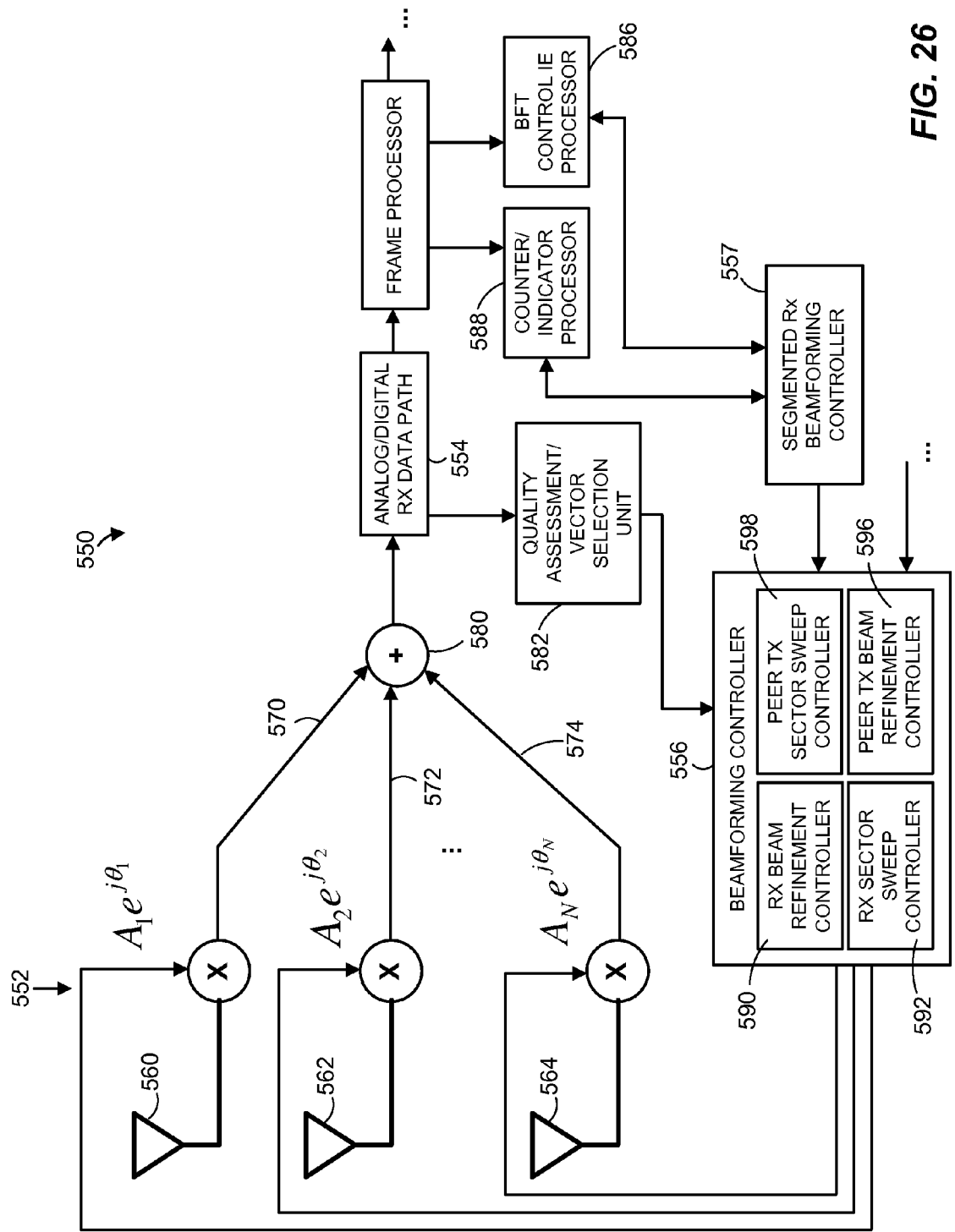
FIG. 26 is a block diagram of an example receiver capable of segmented beamforming training according to an embodiment of the present disclosure.

Now referring to FIG. 26, an example receive unit 550 includes an antenna array 552, an analog/digital transmitter data path 554, a beamforming controller 556 and a segmented Rx beamforming controller 557, antennas 560, 562, and 564, the corresponding delay lines 570, 572, and 574, and an adder 580 that combines the signals from the antennas 560-564 using any suitable technique to generate a signal vector v. A quality assessment unit 582 can generate a quality indicator or metric for the signal vector v. The quality assessment unity 582 can then supply each calculated quality indicator to the vector selection unit 584. To process information related to continuous and/or segmented beamforming, the receive unit 550 includes a BFT control IE processor 586 and a counter/indicator processor 588 in accordance with an embodiment.

In operation, the BFT control IE processor 586 processes such as fields as L-TX, L-RX, L-TX-ACK, and L-RX-ACK discussed above to determine the timing and selection of various beamforming phases. Depending on the embodiment, the counter/indicator processor 588 extracts the values of global counters, local counters, duration indicators, etc. from the received BFT units and supplies this information to the segmented Rx beamforming controller 557.

In an embodiment, the segmented Rx beamforming controller 557 determines how a beamforming session has been segmented. In some scenarios, the segmented Rx beamforming controller 557 processed dynamic updates to the size of a segment of a beamforming session, processes and responds to requests to suspend a segmented beamforming session or to restart a beamforming session, etc.

As discussed above, a station in some scenarios interrupts a segmented beamforming training session already in progress if the quality assessment unit 582, for example, determines that the received signal level is acceptable. The vector selection unit 584 accordingly communicates with a receive beam refinement controller 590 and a receive sector sweep controller 592. Similar to the transmitter architecture illustrated in FIG. 14A, the station 550 includes a memory 594 to store beamforming training capability data.

Further, the beamforming controller 556 includes a peer Tx sector sweep controller 596 and a peer Tx beam refinement controller 598 to evaluate a portion or the entirety of a beamforming session set received during a peer transmit training during a sector sweep session or a beam refinement session, respectively. During this process, in at least some of the embodiments, the beamforming controller 556 applies the same receive steering vector to the antenna array 552. In an embodiment, the peer Tx sector sweep controller 596 and the peer Tx beam refinement controller 598 additionally manage assessed quality of the received training data units, and generate feedback information to be transmitted to the peer device.

Referring back to FIG. 1, the segmented beamforming controller 18 or 19 in some embodiments includes the segmented Tx beamforming controller 514 and the segmented Rx beamforming controller 557. In some embodiments, the segmented beamforming controller 18 or 19 also includes some or all of the components of the Tx beamforming controller 506, and some or all of the components of the Rx beamforming controller 556.

Figure 27:
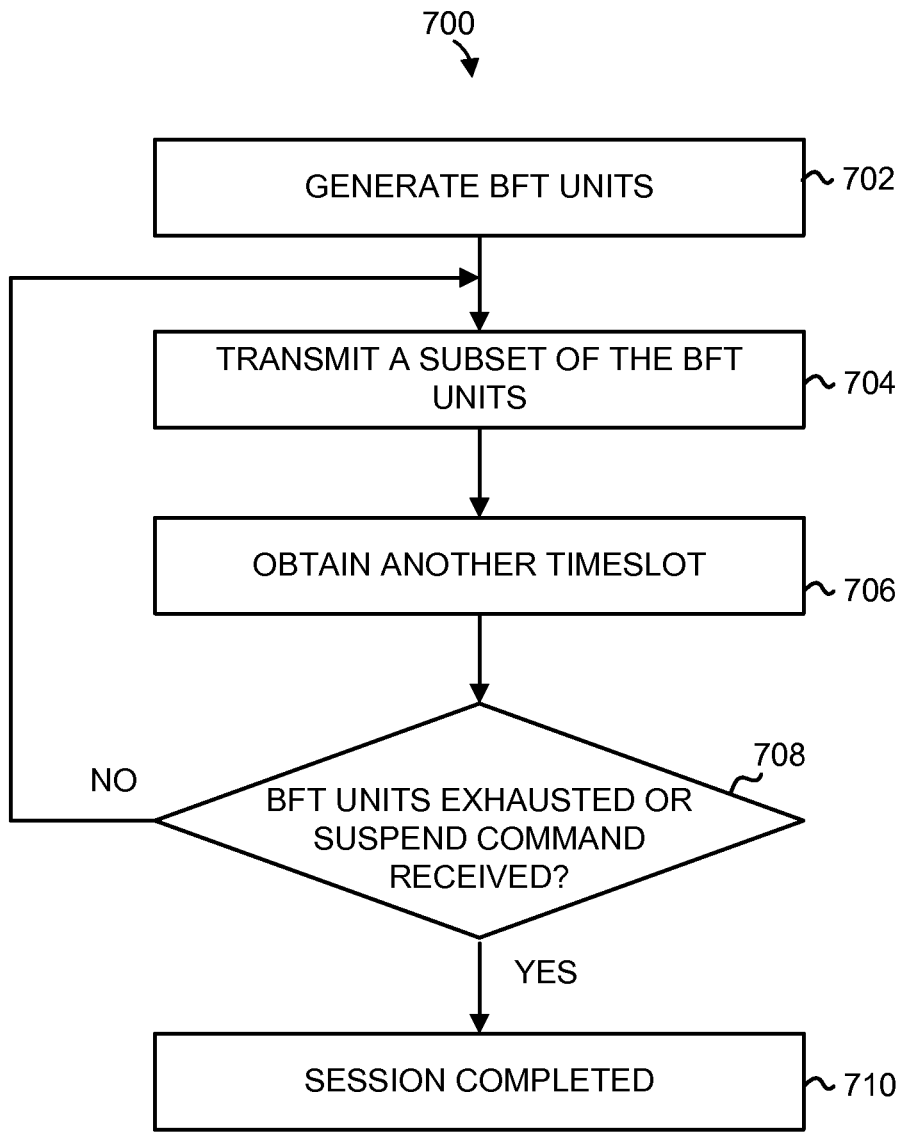
FIG. 27 is a flow diagram of an example method for transmitting BFT units associated with a segmented beamforming session in accordance with an embodiment of the present disclosure.

FIG. 27 is a flow diagram of an example method 700 for transmitting BFT units associated with a segmented beamforming session that can be implemented by the transmit unit 500, for example. In an embodiment, a portion or the entirety of the method 700 is implemented by the segmented Tx beamforming controller 514. At block 702, a plurality of BFT units, or a beamforming set S, is generated. A subset of the generated plurality of BFT units is transmitted at block 704 as a segment of the beamforming session. In some embodiments, BFT units are uniquely indexed within the plurality of BFT units and/or within the subset at block 704 or 702. As one example, the counter/indicator generator 546 in an embodiment generates a global counter and a local counter for each BFT unit.

Next, an additional timeslot is obtained at block 706. In an embodiment, the additional timeslot is obtained within the same superframe (i.e., during the same beacon interval). In another embodiment, the additional timeslot is obtained within a different superframe. At block 708, the method 700 determines whether the entire beamforming set S has been transmitted or a command to suspend the beamforming session has been received from the other device (e.g., a station or a PCP). If the set S has not yet been exhausted, and if the other device wishes the segmented beamforming session to continue, the method returns to block 704. Otherwise, the method completes at block 710.

Figure 28:
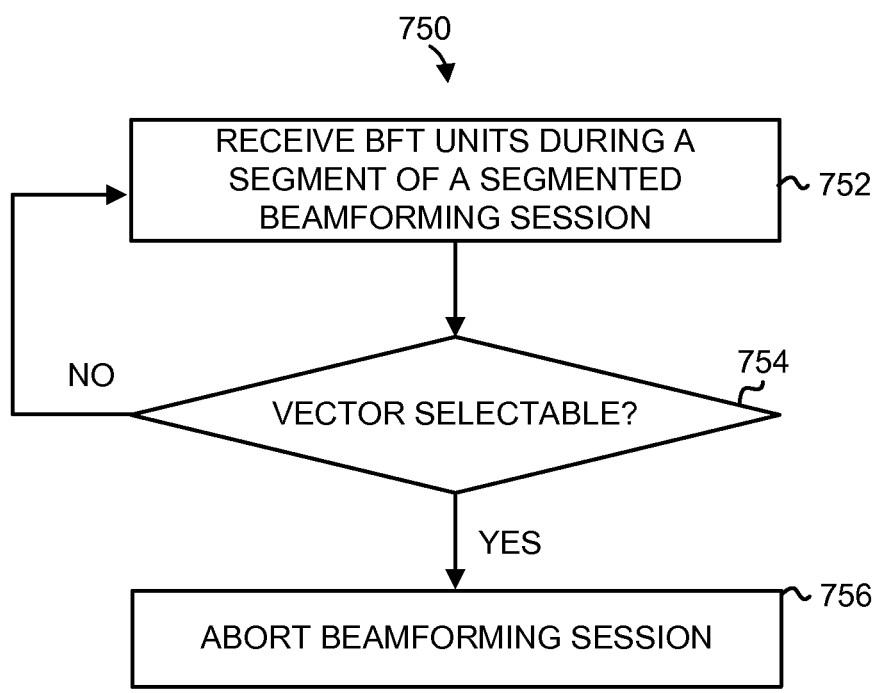
FIG. 28 is a flow diagram of an example method for receiving BFT units during a segmented beamforming session in accordance with an embodiment of the present disclosure.

FIG. 28 is a flow diagram of an example method 750 for transmitting BFT units associated with a segmented beamforming session that can be implemented by the receive unit 550, for example. In an embodiment, a portion or the entirety of the method 750 is implemented by the segmented Rx beamforming controller 557. At block 752, one or several BFT units are received during a segment of a beamforming session. In some embodiments, each received BFT units includes an indication that the BFT unit is associated with a segmented beamforming session rather than a continuous beamforming session. Next, at block 754, the method 750 checks whether any of the one or more received BFT units is associated with a level of quality that permits the selection of the beamsteering vector used to transmit the BFT unit (or, in the case of receive beamforming training, of the beamsteering vector used to receive the BFT unit). Referring back to FIG. 26, for example, the quality assessment/vector selection unit 582 applies an acceptable technique (e.g., SNR measurement) to a received BFT unit to generate a quality metric. The method 750 completes at block 756 if at least one vector is selectable. Otherwise, the control returns to block 752 to receive a new segment of the beamforming session, if available.

Figure 29:
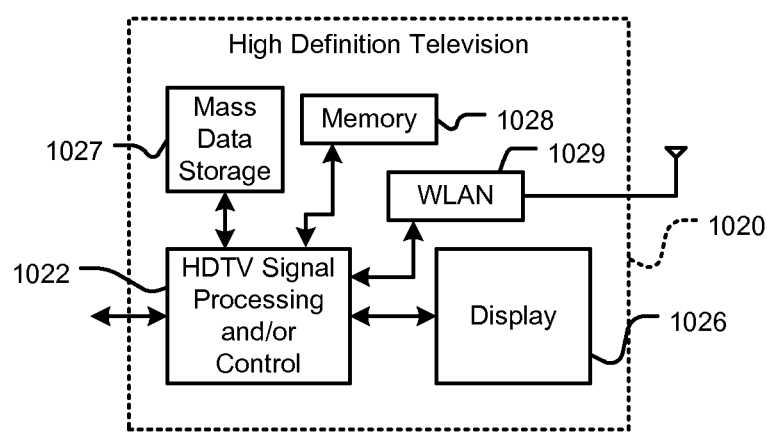
FIG. 29 is a block diagram of a high-definition television that utilizes the techniques of the present disclosure.

Referring now to FIG. 29, segmented beamforming techniques discussed with reference to FIGS. 1-26 can be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 process data, perform coding and/or encryption, perform calculations, format data and/or perform any other type of HDTV processing that may be required. The signal processing and/or control circuit 1022 implement segmented beamforming techniques such as described above.

In an embodiment, HDTV 1020 communicates with a mass data storage 1027 that stores data in a nonvolatile manner such as optical and/or magnetic storage devices. The mass storage device can be a mini HDD that includes one or more platters having a diameter that is smaller than approximately 1.8"HDTV 1020 can be connected to memory 1028 such as RAM, ROM, low latency nonvolatile memory such as flash memory and/or other suitable electronic data storage. HDTV 1020 also can support connections with a WLAN via a WLAN network interface 1029. The WLAN network interface 1029 may implement signal decoding techniques such as described above.

From the foregoing, it will be appreciated that several techniques for beamforming have been disclosed. In an embodiment, a method for beamforming in a communication network includes generating a set of two or more BFT units for a beamforming session between a pair of devices, where each BFT uni in the set of BFT units is associated with a different index, causing a first non-zero subset of the plurality of BFT units to be transmitted during a first timeslot, and causing a second non-empty subset of the plurality of BFT units to be transmitted during a second timeslot, where the first time timeslot and the second timeslot are not contiguous.

In another embodiment, a method for beamforming in a communication network includes generating a plurality of BFT units, where each of the plurality of BFT units is associated with a different direction, causing a first non-zero subset of the plurality of BFT units to be transmitted during a first superframe, and causing a second non-empty subset of the plurality of BFT units to be transmitted during a second superframe.

In another embodiment, a method for beamforming in a communication network includes receiving a plurality of BFT units via a plurality of antennas, including receiving a first non-zero subset of the plurality of BFT units during a first timeslot and receiving a second non-zero subset of the plurality of BFT units during a second timeslot, where the first timeslot and the second timeslot are not contiguous, and where each of the plurality of BFT units corresponds to a different beamsteering vector; and selecting a steering vector based on the received plurality of BFT units.

In another embodiment, an apparatus comprises a segmented beamforming controller having a receive mode and a transmit mode, wherein in the transmit mode the segmented beamforming controller is to transmit a plurality of beamforming training (BFT) units associated with a beamforming session using a different antenna array steering vector for each of the plurality of BFT units during at least two non-contiguous timeslots, and wherein in the receive mode the segmented beamforming controller is to scan for transmitted BFT units using a plurality of different antenna array steering vectors during at least two non-contiguous timeslots.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for beamforming in a communication network, the method comprising:
at a first communication device, generating a plurality of beamforming training (BFT) units associated with a beamforming training session between the first communication device and a second communication device, wherein
each of the plurality of BFT units corresponds to a different respective beamsteering vector from a plurality of beamsteering vectors,
the beamforming training session is for selecting one beamsteering vector from the plurality of beamsteering vectors,
the plurality of beamsteering vectors including a first subset of beamsteering vectors and a second subset of beamsteering vectors,
the first subset of beamsteering vectors spans directions that are not spanned by the second subset of beamsteering vectors, and
the second subset of beamsteering vectors spans directions that are not spanned by the first subset of beamsteering vectors;
causing a first non-zero subset of the plurality of BFT units to be transmitted using beamsteering vectors from the first subset of beamsteering vectors during a first timeslot; and
causing a second non-zero subset of the plurality of BFT units to be transmitted using respective beamsteering vectors from the second subset of beamsteering vectors during a second timeslot,
wherein the first timeslot and the second timeslot are i) not contiguous and ii) separated by a third timeslot that is designated for communications other than the beamforming training session.

2. The method of claim 1, wherein:
each BFT unit in the first non-zero subset includes a local index that uniquely identifies the BFT unit within the first non-zero subset, but does not uniquely identify the BFT unit within the plurality of BFT units; and
each BFT unit in the second non-zero subset includes a local index that uniquely identifies the BFT unit within the second non-zero subset, but does not uniquely identify the BFT unit within the plurality of BFT units.

3. The method of claim 2, wherein each BFT unit includes a global index that uniquely identifies the BFT within the plurality of BFT units.

4. The method of claim 3, wherein each global index indicates a corresponding beamsteering vector used to transmit the corresponding BFT unit.

5. The method of claim 1, wherein the beamforming training session is one of a sector sweep session or a beam refinement session.

6. The method of claim 1, wherein the first timeslot is in a first beacon interval and the second timeslot is in a second beacon interval distinct from the first beacon interval.

7. The method of claim 6, wherein the first timeslot is a first beacon time (BT) timeslot in the first beacon interval, and the second timeslot is a second BT timeslot in the second beacon interval.

8. The method of claim 7, wherein the BFT units also serve as discovery beacons.

9. The method of claim 1, wherein the first timeslot is a first association beamforming training (A-BFT) timeslot, and the second timeslot is a second A-BFT timeslot.

10. The method of claim 1, wherein the first timeslot is a beacon time (BT) timeslot, and the second timeslot is a service period (SP) timeslot.

11. The method of claim 1, wherein the first timeslot is one of an association beamforming training (A-BFT) timeslot, a service period (SP) timeslot, or a contention-based period (CBP) timeslot, and the second timeslot is one of an SP timeslot or a CBP timeslot.

12. The method of claim 1, wherein each of the plurality of BFT units includes an indicator to indicate that the beamforming training session is segmented between at least two non-contiguous timeslots.

13. The method of claim 1, further comprising:
receiving, at the first communication device, a frame after the first subset is transmitted but before the second subset is transmitted, wherein the frame includes scheduling information related to at least one superframe; and
selecting, at the first communication device, the second timeslot based on the scheduling information.

14. The method of claim 1, further comprising:
receiving, at the first communication device, a beacon frame before the first subset is transmitted and before the second subset is transmitted, wherein the beacon frame includes a beamforming training duration limitation; and
distributing, at the first communication device, transmission of the plurality of BFT units among a plurality of timeslots including the first timeslot and the second timeslot in accordance with the beamforming training duration limitation.

15. The method of claim 14, wherein the beamforming training duration limitation specifies a duration of a time period allocated for the beamforming training session, wherein the time period is associated with one of a CBP timeslot or an SP timeslot.

16. The method of claim 1, further comprising:
receiving a feedback frame after the first subset is transmitted but before the second subset is transmitted,
wherein causing the second subset to be transmitted includes causing the second subset to be transmitted in response to an information element included in the feedback frame.

17. A method for beamforming in a communication network, the method comprising:
generating a plurality of beamforming training (BFT) units associated with a beamforming training session between a pair of communication devices, wherein
each of the plurality of BFT units corresponds to a different beamsteering vector and includes an index that uniquely identifies the BFT unit in the plurality of BFT units, and
the beamforming training session is for selecting one beamsteering vector from the plurality of beamsteering vectors;
causing a first non-zero subset of the plurality of BFT units to be transmitted during a first timeslot,
wherein each BFT unit in the first subset of the plurality of BFT units further includes a first indication that indicates at least one of i) a time interval remaining until the end of the first timeslot, and ii) a number of remaining BFT units, if any, that follow the BFT unit in the first timeslot; and
causing a second non-zero subset of the plurality of BFT units to be transmitted during a second timeslot,
wherein each BFT unit in the second subset of the plurality of BFT units further includes a second indication that indicates at least one of i) a time interval remaining until the end of the second timeslot and ii) a number of remaining BFT units, if any, that follow the BFT unit in the second timeslot.

18. The method of claim 17, further comprising:
receiving a feedback frame after the first subset is transmitted but before the second subset is transmitted,
wherein causing the second subset to be transmitted includes causing the second subset to be transmitted in response to an information element included in the feedback frame.

19. The method of claim 17, further comprising:
receiving a frame after the first subset is transmitted but before the second subset is transmitted, wherein the frame includes scheduling information related to at least one superframe; and
selecting the second timeslot based on the scheduling information.

20. The method of claim 17, further comprising:
receiving a beacon frame before the first subset is transmitted and before the second subset is transmitted, wherein the beacon frame includes a beamforming duration limitation; and
distributing transmission of the plurality of BFT units among a plurality of timeslots including the first timeslot and the second timeslot in accordance with the beamforming duration limitation.

21. The method of claim 20, wherein the beamforming duration limitation specifies a duration of a time period allocated for the beamforming training session, wherein the time period is associated with one of a CBP timeslot or an SP timeslot.

22. An apparatus comprising:
a network interface device having one or more integrated circuits configured to
segment a plurality of beamforming training (BFT) units associated with a beamforming session into at least a first non-zero subset and a second non-zero subset,
wherein each of the plurality of BFT units corresponds to a different beamsteering vector and includes an index that uniquely identifies the BFT unit in the plurality of BFT units, and
wherein the beamforming training session is for selecting one beamsteering vector from the plurality of beamsteering vectors,
cause the first subset to be transmitted during a first timeslot,
wherein each BFT unit in the first subset of the plurality of BFT units further includes a first indication that indicates at least one of i) a time interval remaining until the end of the first timeslot, and ii) a number of remaining BFT units, if any, that follow the BFT unit in the first timeslot, and
cause the second subset to be transmitted during a second timeslot,
wherein each BFT unit in the second subset of the plurality of BFT units further includes a second indication that indicates at least one of i) a time interval remaining until the end of the second timeslot and ii) a number of remaining BFT units, if any, that follow the BFT unit in the second timeslot, and
apply a different steering vector to an antenna array as each of the plurality of BFT units is transmitted.

23. The apparatus of claim 22,
wherein the beamforming training session is a sector sweeping session, and
wherein the first timeslot is a beacon time (BT) timeslot.

24. The apparatus of claim 23, wherein each of the BFT units also serves as a discovery beacon.

25. The apparatus of claim 22, wherein the second timeslot is a service period (SP) allocated in response to a frame received after the first subset is transmitted.

* * * * *